US012118426B1

(12) United States Patent
Barkan et al.

(10) Patent No.: US 12,118,426 B1
(45) Date of Patent: Oct. 15, 2024

(54) BIOPTIC BARCODE READER WITH ROTATED FIELD-OF-VIEW

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/375,329

(22) Filed: Sep. 29, 2023

(51) Int. Cl.
*G06Q 20/20* (2012.01)
*G06K 7/10* (2006.01)

(52) U.S. Cl.
CPC ....... *G06K 7/10831* (2013.01); *G06K 7/1096* (2013.01)

(58) Field of Classification Search
CPC .............. G01G 23/3735; G01G 21/22; G06Q 20/208; G07G 1/0018; G06K 7/10831; G06K 7/1096

USPC ..................................................... 235/462.14
See application file for complete search history.

(56) References Cited

U.S. PATENT DOCUMENTS

| | | | |
|---|---|---|---|
| 11,210,481 B1* | 12/2021 | Drzymala ........... | G06K 7/10574 |
| 2013/0141584 A1* | 6/2013 | Wittenberg ........ | G06K 7/10732 |
| | | | 348/150 |
| 2016/0292475 A1* | 10/2016 | Madej .................. | G06F 16/907 |
| 2018/0300519 A1* | 10/2018 | Trajkovic ................ | G06K 7/14 |
| 2022/0268623 A1* | 8/2022 | Barkan .............. | G01G 23/3735 |
| 2022/0270065 A1* | 8/2022 | Barkan ................. | G06V 40/28 |
| 2023/0186270 A1* | 6/2023 | Barkan ................. | G07G 3/006 |
| | | | 705/23 |

* cited by examiner

*Primary Examiner* — Daniel A Hess
(74) *Attorney, Agent, or Firm* — Yuri Astvatsaturov

(57) ABSTRACT

An example bioptic barcode reader includes a housing having a lower housing portion with an upper surface facing a product scanning region, an upper housing portion extending above the lower housing portion, a generally horizontal window positioned at the upper surface, a generally upright window positioned in the upper housing portion, an imaging assembly with a primary field-of-view (FOV), and a first mirror configured to redirect a first portion of the primary FOV towards the upper housing portion. An optical element arrangement is configured to rotate a second portion of the primary FOV by 90 degrees about a central axis of the second portion of the primary FOV.

22 Claims, 17 Drawing Sheets

BIOPTIC BARCODE READER WITH ROTATED FIELD-OF-VIEW

BACKGROUND

Typical bioptic barcode readers use sensor designs that split the field-of-view (FOV) between the vertical and horizontal windows or that direct a portion of the FOV toward the vertical window and another portion of the FOV toward the horizontal window. This split of the FOV forces a horizontal portion that is wider than it is tall, which necessitates a horizontal window that is wider than it is long. This provides a smaller target for user to aim for when swiping a product across the horizontal window. Therefore, it would be beneficial to have a bioptic barcode reader that had a horizontal window that is longer than it is wide, to provide a larger target for a user to aim for, which would require that the portion of the FOV directed through the horizontal window also be rotated by 90 degrees so that it can still fill the horizontal window.

SUMMARY

In an embodiment, the present invention is a bioptic barcode reader comprising a housing having a lower housing portion with an upper surface facing a product scanning region and an upper housing portion extending above the lower housing portion. A generally horizontal window is positioned at the upper surface of the lower housing portion and a generally upright window is positioned in the upper housing portion. An imaging assembly is positioned within the housing and has a primary field-of-view (FOV) and a first mirror is positioned within the housing and is configured to redirect a first portion of the primary FOV towards the upper housing portion. An optical element arrangement is positioned within the housing and is configured to rotate a second portion of the primary FOV, separate from the first portion of the primary FOV, by about 90 degrees about a central axis of the second portion of the primary FOV.

In a variation of this embodiment, the bioptic barcode reader comprises a second mirror and a third mirror. The first mirror is configured to redirect the first portion of the primary FOV towards the third mirror, the second mirror is configured to redirect the second portion of the primary FOV through the generally horizontal window, and the third mirror is configured to redirect the first portion of the primary FOV through the generally upright window.

In another variation of this embodiment, a length of the generally horizontal window is greater than a width of the generally horizontal window and the generally horizontal window is positioned such that the length is generally parallel to a longitudinal axis of the lower housing portion and the width extends generally perpendicular to the longitudinal axis of the lower housing portion.

In another variation of this embodiment, the optical element arrangement comprises a dove prism.

In another variation of this embodiment, the dove prism comprises a reflective bottom surface, a diffractive entry surface extending from the reflective bottom surface at an angle between 40 degrees and 50 degrees to the reflective bottom surface, and a diffractive exit surface opposite the diffractive entry surface and extending from the reflective bottom surface at an angle between 40 degrees and 50 degrees to the reflective bottom surface. The dove prism is rotated between 40 degrees and 50 degrees about a longitudinal axis of the dove prism such that the reflective bottom surface is oriented at an angle to the upper surface of the lower housing portion between 40 degrees and 50 degrees and is positioned such that the diffractive entry surface is oriented at an angle between 40 degrees and 50 degrees relative to the central axis of the second portion of the primary FOV and the second portion of the primary FOV passes through the diffractive entry surface.

In another variation of this embodiment, the reflective bottom surface is a total internal reflective surface.

In another variation of this embodiment, the reflective bottom surface is a mirror surface applied to a bottom surface of the dove prism.

In another variation of this embodiment, the optical element arrangement comprises a first prism, a fourth mirror, and a second prism. The first prism is positioned in a path of the second portion of the primary FOV and is configured to diffract the second portion of the primary FOV towards the fourth mirror. The fourth mirror is configured to reflect the second portion of the primary FOV diffracted by the first prism towards the second prism. The second prism is configured to diffract the second portion of the primary FOV reflected by the fourth mirror.

In another variation of this embodiment, the first prism comprises a diffractive entry surface, the first prism is positioned and oriented such that the diffractive entry surface is oriented at an angle between 40 degrees and 50 degrees relative to the central axis of the second portion of the primary FOV and the second portion of the primary FOV passes through the diffractive entry surface, the second prism comprises a diffractive exit surface, and the second prism is positioned and oriented such that the diffractive exit surface is oriented at an angle between 40 degrees and 50 degrees relative to the central axis of the second portion of the primary FOV.

In another variation of this embodiment, the optical element arrangement comprises a fifth mirror, a sixth mirror, and a seventh mirror. The fifth mirror is positioned in a path of the second portion of the primary FOV and is configured to reflect the second portion of the primary FOV towards the sixth mirror. The sixth mirror is configured to reflect the second portion of the primary FOV reflected by the fifth mirror towards the seventh mirror. The seventh mirror is configured to reflect the second portion of the primary FOV reflected by the sixth mirror.

In another variation of this embodiment, the fifth mirror is rotated about a Z axis that extends laterally between side walls of the lower housing portion such that the fifth mirror is oriented at a 45 degree angle relative to the upper surface and reflects the second portion of the primary FOV away from the upper surface of the lower housing portion. The sixth mirror is rotated about a X axis that extends longitudinally between a front wall and a rear wall of the lower housing portion such that the sixth mirror is oriented at a 45 degree angle relative to the upper surface and reflects the second portion of the primary FOV reflected by the fifth mirror laterally between the side walls of the lower housing portion. The seventh mirror is rotated about a Y axis that extends vertically between the upper surface and a bottom wall of the lower housing portion such that the seventh mirror is oriented at an angle between 40 degrees and 50 degrees relative to a rear wall of the lower housing portion and reflects the second portion of the primary FOV reflected by the sixth mirror away from the rear wall of the lower housing portion.

In another embodiment, the present invention is a bioptic barcode reader comprising a housing having a lower housing portion with an upper surface facing a product scanning region and an upper housing portion extending above the lower housing portion. A generally horizontal window is positioned at the upper surface of the lower housing portion and a generally upright window is positioned in the upper housing portion. An imaging assembly having a primary field-of-view (FOV) and a mirror arrangement are positioned within the housing. The mirror arrangement includes at least one of a transflective mirror and a dichroic mirror, a second mirror, and a third mirror. The transflective mirror or dichroic mirror is positioned in a path of the primary FOV, the second mirror is configured to redirect the primary FOV through the generally horizontal window, and the third mirror is configured to redirect the primary FOV through the generally upright window. An optical element arrangement is positioned within the housing and is configured to rotate the primary FOV by 90 degrees about a central axis of the primary FOV.

In a variation of this embodiment, the optical element arrangement is positioned between the transflective mirror or dichroic mirror and the second mirror.

In another variation of this embodiment, a length of the generally horizontal window is greater than a width of the generally horizontal window and the generally horizontal window is positioned such that the length is generally parallel to a longitudinal axis of the lower housing portion and the width extends generally perpendicular to the longitudinal axis of the lower housing portion.

In another variation of this embodiment, the optical element arrangement comprises a dove prism.

In another variation of this embodiment, the dove prism comprises a reflective bottom surface, a diffractive entry surface extending from the reflective bottom surface at an angle between 40 degrees and 50 degrees to the reflective bottom surface, and a diffractive exit surface opposite the diffractive entry surface and extending from the reflective bottom surface at an angle between 40 degrees and 50 degrees to the reflective bottom surface. The dove prism is rotated 45 degrees about a longitudinal axis of the dove prism such that the reflective bottom surface is oriented at an angle to the upper surface of the lower housing portion between 40 degrees and 50 degrees and is positioned such that the diffractive entry surface is oriented at an angle between 40 degrees and 50 degrees relative to the central axis of the primary FOV and the primary FOV that passes through the transflective mirror passes through the diffractive entry surface.

In another variation of this embodiment, the reflective bottom surface is a total internal reflective surface.

In another variation of this embodiment, the reflective bottom surface is a mirror surface applied to a bottom surface of the dove prism.

In another variation of this embodiment, the optical element arrangement comprises a first prism, a fourth mirror, and a second prism. The first prism is positioned in a path of the primary FOV that passes through the transflective mirror and is configured to diffract the primary FOV that passes through the transflective mirror towards the third mirror. The third mirror is configured to reflect the primary FOV diffracted by the first prism towards the second prism. The second prism is configured to diffract the primary FOV reflected by the third mirror towards the second mirror.

In another variation of this embodiment, the first prism comprises a diffractive entry surface, the first prism is positioned and oriented such that the diffractive entry surface is oriented at an angle between 40 degrees and 50 degrees relative to the central axis of the primary FOV, and the primary FOV that passes through the transflective mirror passes through the diffractive entry surface. The second prism comprises a diffractive exit surface and the second prism is positioned and oriented such that the diffractive exit surface is oriented at an angle between 40 degrees and 50 degrees relative to the central axis of the primary FOV.

In another variation of this embodiment, the optical element arrangement comprises a fifth mirror, a sixth mirror, and a seventh mirror. The fifth mirror is positioned in a path of the primary FOV that passes through the transflective mirror or dichroic mirror and is configured to reflect the primary FOV that passes through the transflective mirror or dichroic mirror towards the sixth mirror. The sixth mirror is configured to reflect the primary FOV reflected by the fifth mirror towards the seventh mirror. The seventh mirror is configured to reflect the primary FOV reflected by the sixth mirror towards the second mirror.

In another variation of this embodiment, the fifth mirror is rotated about a Z axis that extends laterally between side walls of the lower housing portion such that the fifth mirror is oriented at a 45 degree angle relative to the upper surface and reflects the primary FOV that passes through the transflective mirror or dichroic mirror away from the upper surface of the lower housing portion, the sixth mirror is rotated about a X axis that extends longitudinally between a front wall and a rear wall of the lower housing portion such that the sixth mirror is oriented at a 45 degree angle relative to the upper surface and reflects the primary FOV reflected by the fifth mirror between the side walls of the lower housing portion, and the seventh mirror is rotated about a Y axis that extends vertically between the upper surface and a bottom wall of the lower housing portion such that the seventh mirror is oriented at an angle between 40 degrees and 50 degrees relative to a rear wall of the lower housing portion and reflects the primary FOV reflected by the sixth mirror away from the rear wall of the lower housing portion

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
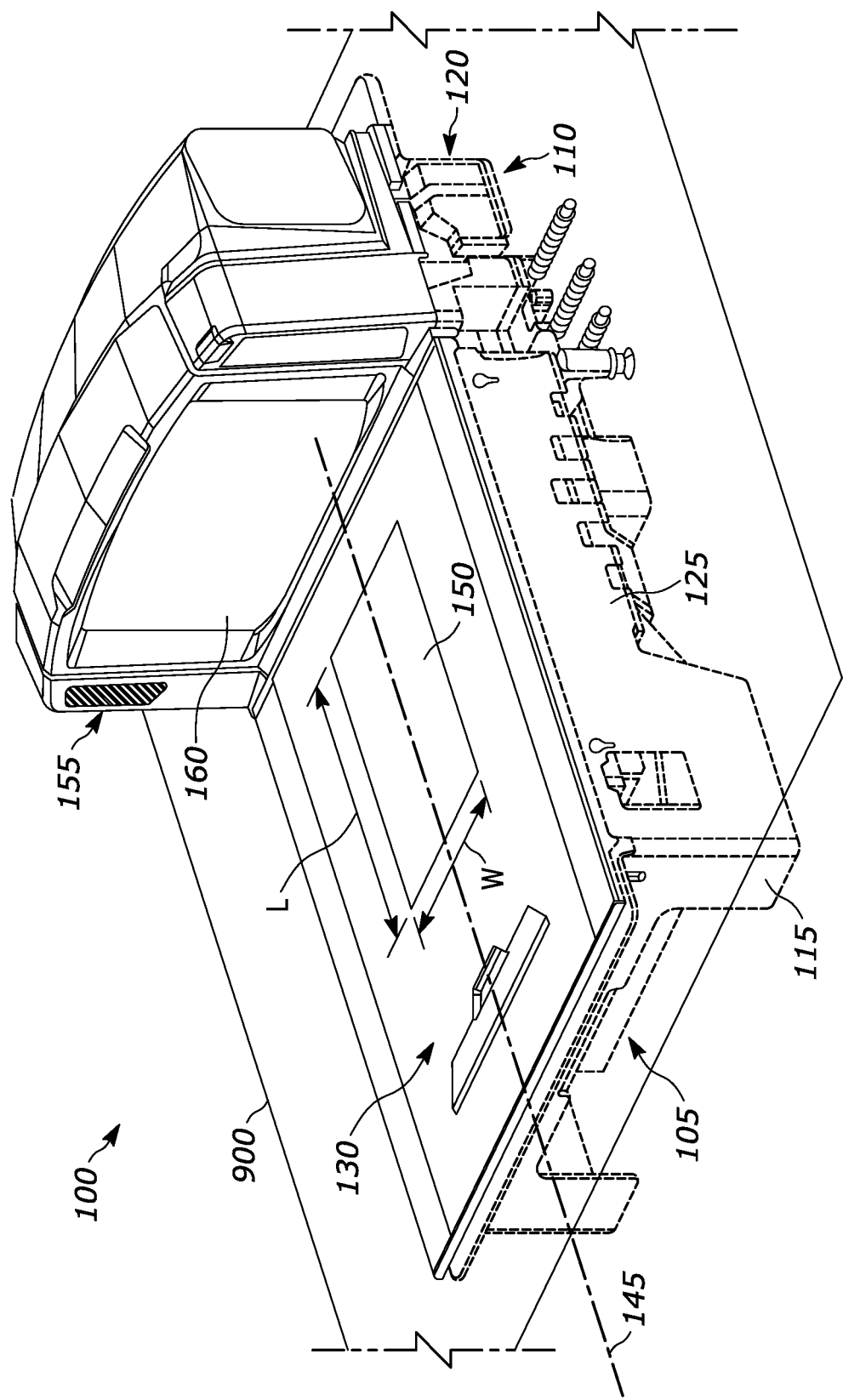
FIG. 1 illustrates a front perspective view of an example bioptic barcode reader.
Figure 2:
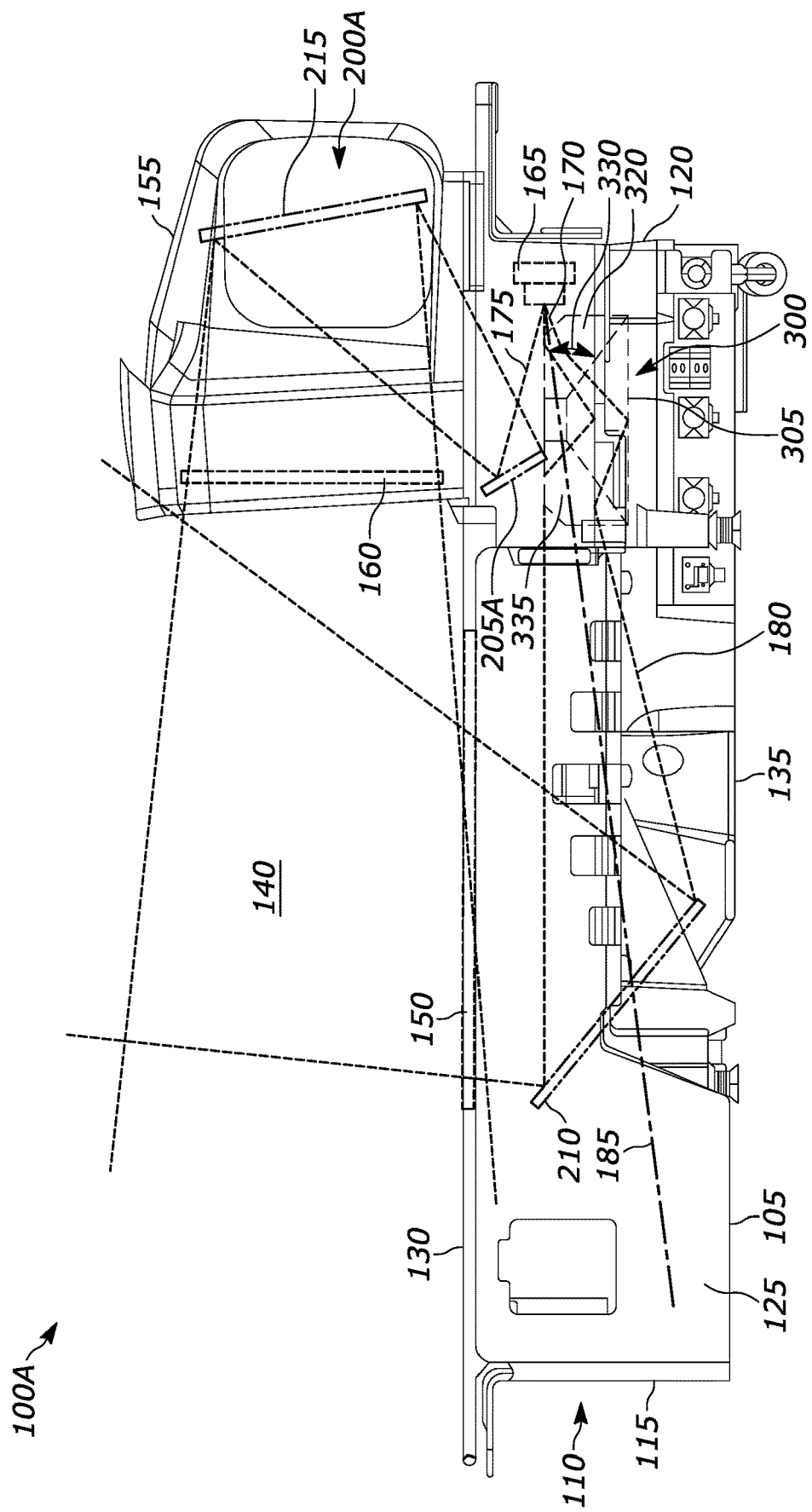
FIG. 2 illustrates a side view of a first embodiment of the bioptic barcode reader of FIG. 1.
Figure 3:
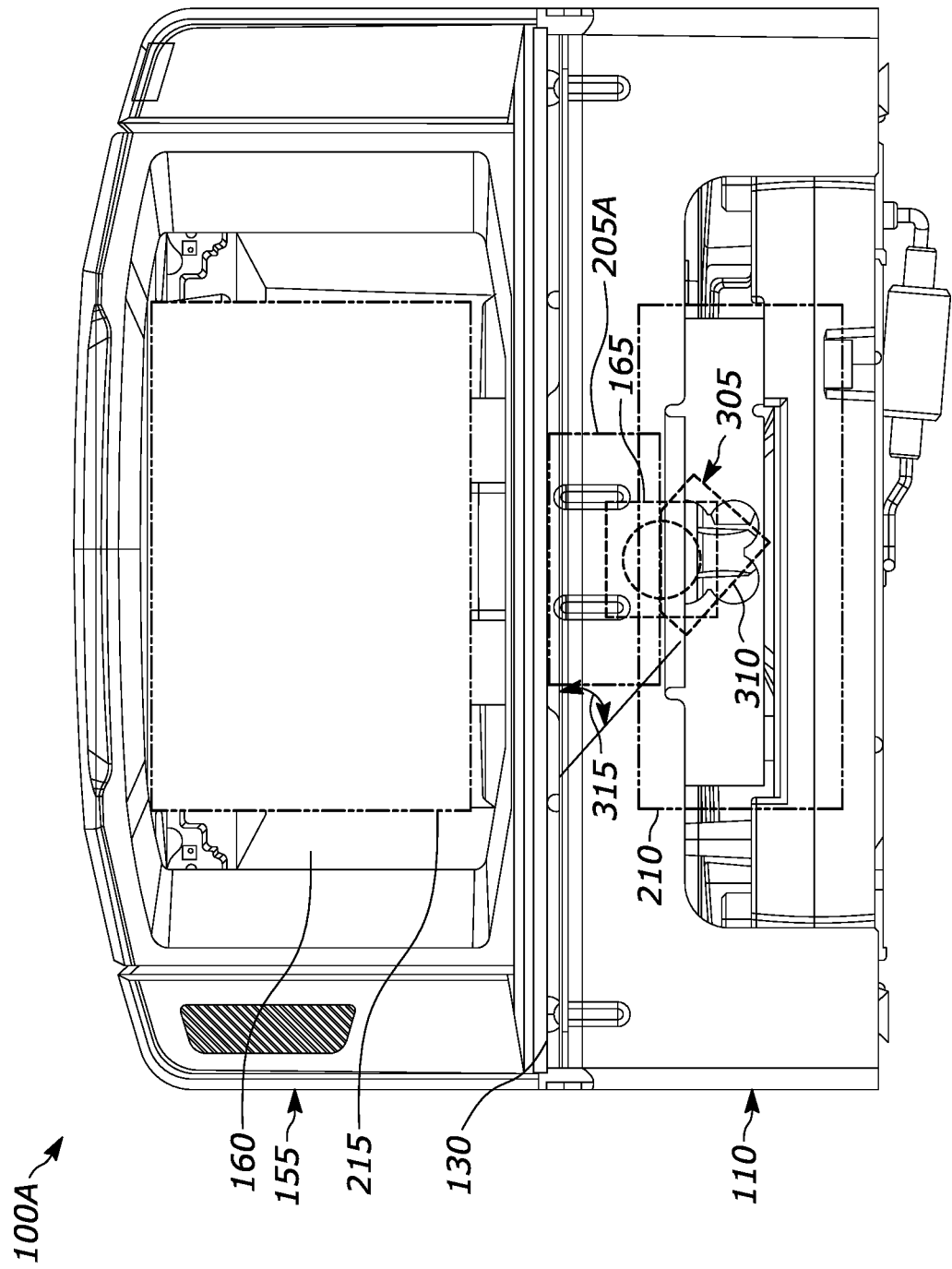
FIG. 3 illustrates a front view of the bioptic barcode reader of FIG. 2.
Figure 4:
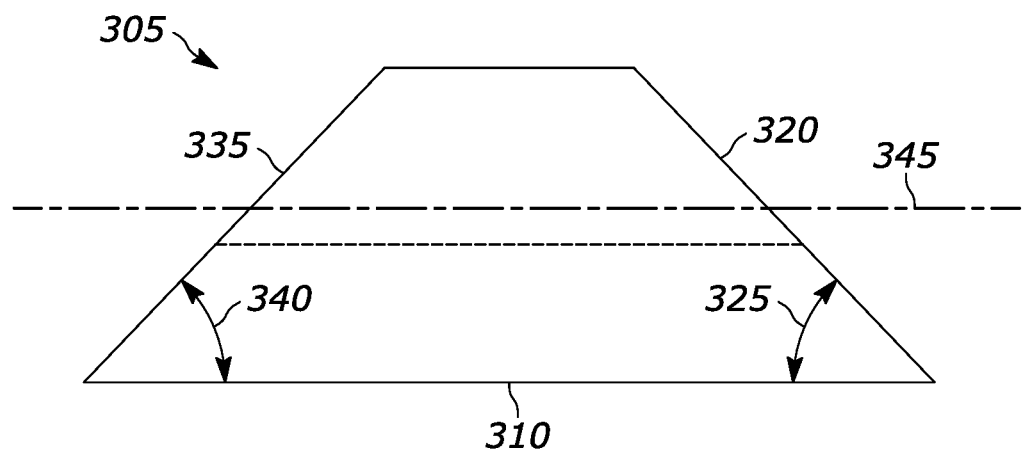
FIG. 4 illustrates a side view of a dove prism of the bioptic barcode reader of FIG. 2.
Figure 5:
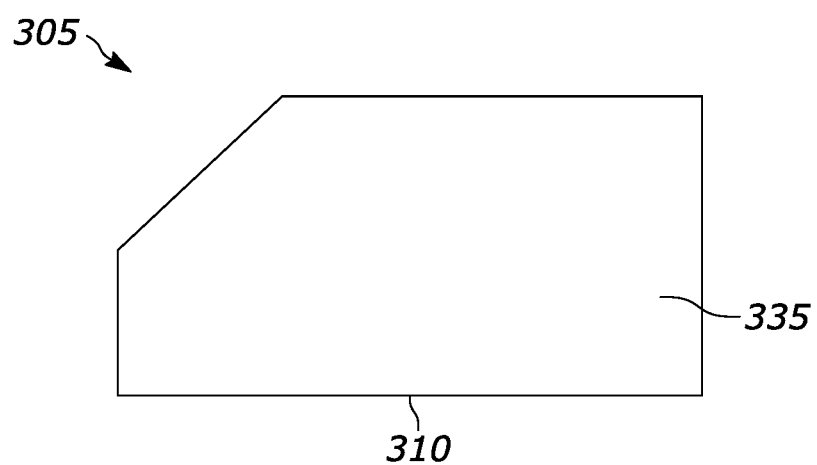
FIG. 5 illustrates a front view of the dove prism of FIG. 4.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example bioptic barcode readers disclosed herein use mirror arrangements and optical element arrangements to rotate a desired portion of a primary FOV of an imaging assembly by 90 degrees.

In one example, this is accomplished by an optical element arrangement having a dove prism positioned in front of a portion of the primary FOV where rotation is desired. By rotating the dove prism 45 degrees, it creates a FOV rotation of 90 degrees. If needed, the dove prism can be cut such that one edge of it is along the split line of the primary FOV. The dove prism could be cut from glass in the case of a larger FOV portion or molded from plastic in the case of a smaller FOV segment. The dove prism could be held by a chassis or carrier in the appropriate location along the path of the portion of the primary FOV.

In another example, the dove prism is broken into component elements, a first prism, a mirror, and a second prism. The first and second prisms could be made from separate prism wedges and the mirror could be separate from the first and second prisms.

In yet another example, the portion of the primary FOV could be rotated using three mirrors, each rotated by 45 degrees from the X, Y, and Z axes respectively, and positioned in sequential positions along the portion of FOV being rotated.

Referring to FIG. 1, an example bioptic barcode reader 100, such as the Zebra® MP7200 bioptic barcode reader, is shown and can be configured to be supported by a workstation 900, such as a checkout counter at a POS of a retail store. In the example shown, bioptic barcode reader 100 has a housing 105 that includes a lower housing portion 110 and an upper housing portion 155 that extends above lower housing portion 110. A generally horizontal window 150 is positioned at an upper surface 130 of lower housing portion 110, which faces a product scanning region 140, to allow a set of optical components positioned within housing 105 to direct at least one FOV or a portion of a FOV through horizontal window 150. A length L of horizontal window 150 is generally parallel to a longitudinal axis 145 of lower housing portion 110 and is greater than a width W of horizontal window 150, which extends generally perpendicular to longitudinal axis 145. Upper housing portion 155 includes a generally upright window 160 to allow the set of optical components to direct at least one FOV or portion of a FOV through upright window 160. The fields-of-view directed through horizontal window 150 and upright window 160 intersect to define product scanning region 140, where an object can be scanned for sale at the POS.

Referring to FIGS. 2-5, a first embodiment of bioptic barcode reader 100, designated 100A, is illustrated, which includes an example imaging assembly 165 that is positioned within housing 105 and has a primary FOV 170, a first example mirror arrangement 200A, and a first example optical element arrangement 300. Imaging assembly 165 can include an imager, such as a CMOS digital image sensor, that can be configured to capture an image of an object, such as a product that is positioned within product scanning region 140.

Mirror arrangement 200A includes a first mirror 205A, a second mirror 210 positioned in lower housing portion 110, and a third mirror 215 positioned in upper housing portion 155. First mirror 205A is positioned within housing 105 and is configured to redirect a first portion 175 of primary FOV 170 of imaging assembly 165 towards third mirror 215 in upper housing portion 155. Second mirror 210 is configured to redirect a second portion 180 of primary FOV 170 of imaging assembly 165, separate from first portion 175, through horizontal window 150. Third mirror 215 is configured to redirect first portion 175 of primary FOV 170 reflected from first mirror 205A through upright window 160.

Optical element arrangement 300 is positioned within housing 105 and is configured to rotate second portion 180 of primary FOV 170 by 90 degrees about a central axis 185 of second portion 180 of primary FOV 170. Alternatively, or in addition to rotating second portion 180 of primary FOV 170, optical element arrangement 300 can also be configured to rotate first portion 175 of primary FOV by 90 degrees about a central axis of first portion 175. Rotation of second portion 180 of primary FOV 170 allows horizontal window 150 to be rotated such that the greater length L of horizontal window 150 is oriented generally parallel to longitudinal axis 145 of lower housing portion 110 and the smaller width W of horizontal window 150 is oriented generally perpendicular to longitudinal axis 145. This orientation of horizontal window 150 provides a larger longitudinal distance for items to be swiped laterally (perpendicular to longitudinal axis 145 in either direction) across horizontal window 150 while allowing a greater portion of second portion 180 of primary FOV 170 of imaging assembly 165 to pass through horizontal window 150.

Rather than first mirror 205A being a planar mirror, as shown, and bioptic barcode reader 100A having only third mirror 215 in upper housing portion 155, first mirror 205A could be a concave or convex splitter mirror that splits first portion 175 of primary FOV 170 into two additional portions, directs one of the additional portions toward third mirror 215 and the other additional portion toward a fourth mirror in upper housing portion 155, which would provide two fields-of-view through upright window 160. In another example, bioptic barcode reader 100A could have two imaging assemblies, or an imaging assembly with two imagers, where the entire FOV of one imaging assembly (imager) is directed toward first mirror 205A and the entire FOV of the other imaging assembly (imager) is directed toward second mirror 210 and is rotated by optical element arrangement 300.

In the example shown, optical element arrangement 300 includes a dove prism 305 having a reflective bottom surface 310, a diffractive entry surface 320, and diffractive exit surface 335 opposite diffractive entry surface 320. Reflective bottom surface 310 can be a total internal reflective surface or can be a mirror surface that is applied to the bottom surface of dove prism 305. Diffractive entry surface 320 extends from reflective bottom surface 310 at an angle 325 between 40 degrees and 50 degrees, preferably 45 degrees, to reflective bottom surface 310 and diffractive exit surface 335 extends from reflective bottom surface 310 at an angle 340 between 40 degrees and 50 degrees, preferably 45 degrees, to reflective bottom surface 310. Rotation of dove prism 305 about central axis 185 by a certain angle (e.g., 45 degrees) will rotate second portion 180 of primary FOV 170 by an angle twice that of the angle of rotation of dove prism 305 (e.g., 90 degrees). Therefore, any desired rotation of second portion 180 can be obtained by rotating dove prism 305 half of the desired rotation of second portion 180 (e.g., rotating dove prism 305 35 degrees will rotate second portion 180 70 degrees).

To rotate second portion 180 of primary FOV 170 by 90 degrees about central axis 185, dove prism 305 is rotated between 40 degrees and 50 degrees, preferably 45 degrees, about a longitudinal axis 345 of dove prism 305 such that reflective bottom surface 310 is oriented at an angle 315 between 40 degrees and 50 degrees, preferably 45 degrees, relative to upper surface 130 of lower housing portion 110. Dove prism 305 is also positioned such that diffractive entry surface 320 is oriented at an angle 330 between 40 degrees and 50 degrees, preferably 45 degrees, relative to central axis 185 of second portion 180 of primary FOV 170. With dove prism 305 positioned and oriented in this manner, second portion 180 of primary FOV 170 will enter dove prism 305 through diffractive entry surface 320 and be diffracted towards reflective bottom surface 310, will be reflected off of reflective bottom surface 310 towards diffractive exit surface 335, and will exit dove prism 305 through diffractive exit surface 335 and be diffracted towards second mirror 210 rotated by 90 degrees relative to the orientation of second portion 180 when entering dove prism 305.

Figure 6:
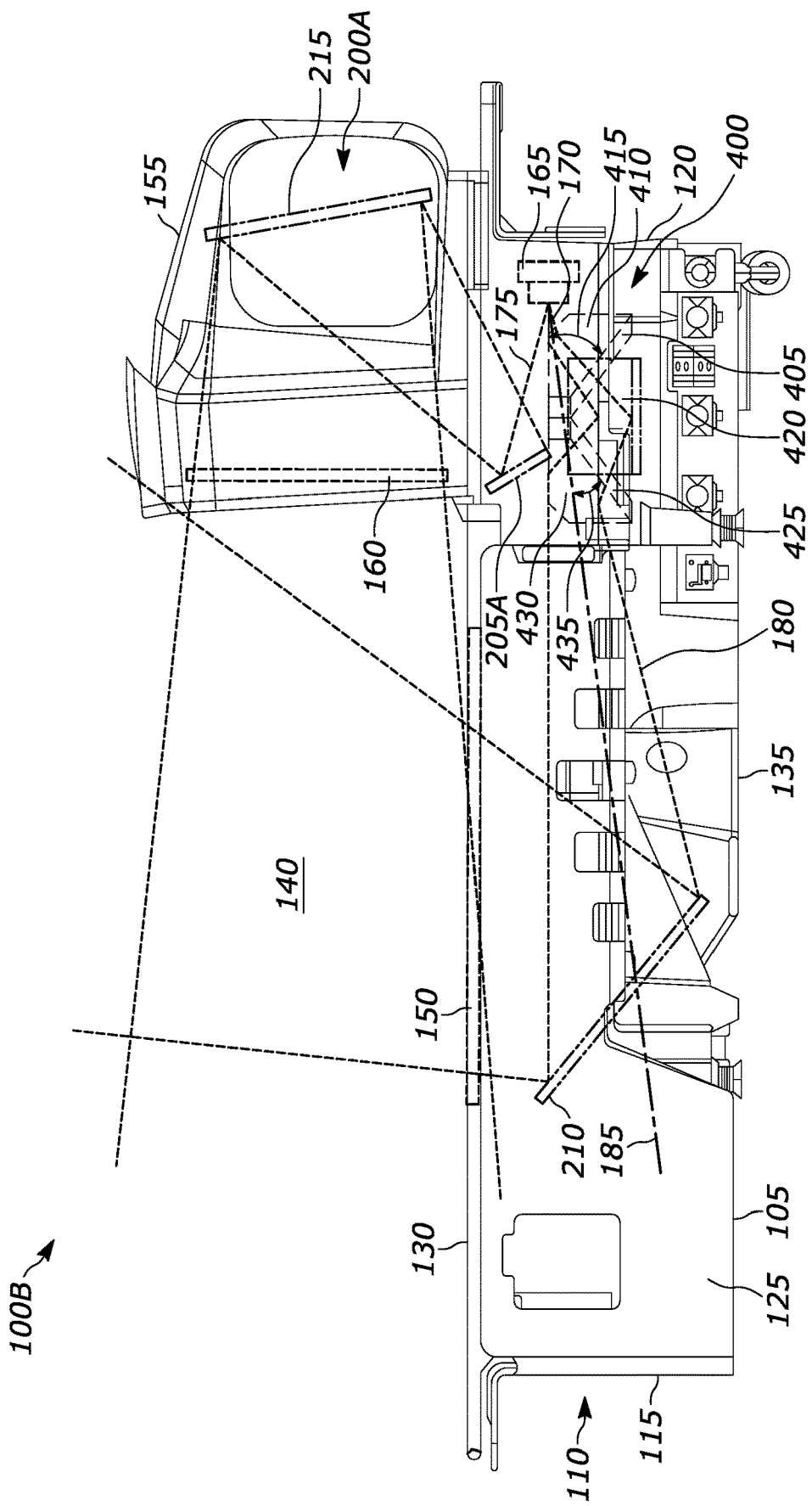
FIG. 6 illustrates a side view of a second embodiment of the bioptic barcode reader of FIG. 1.
Figure 7:
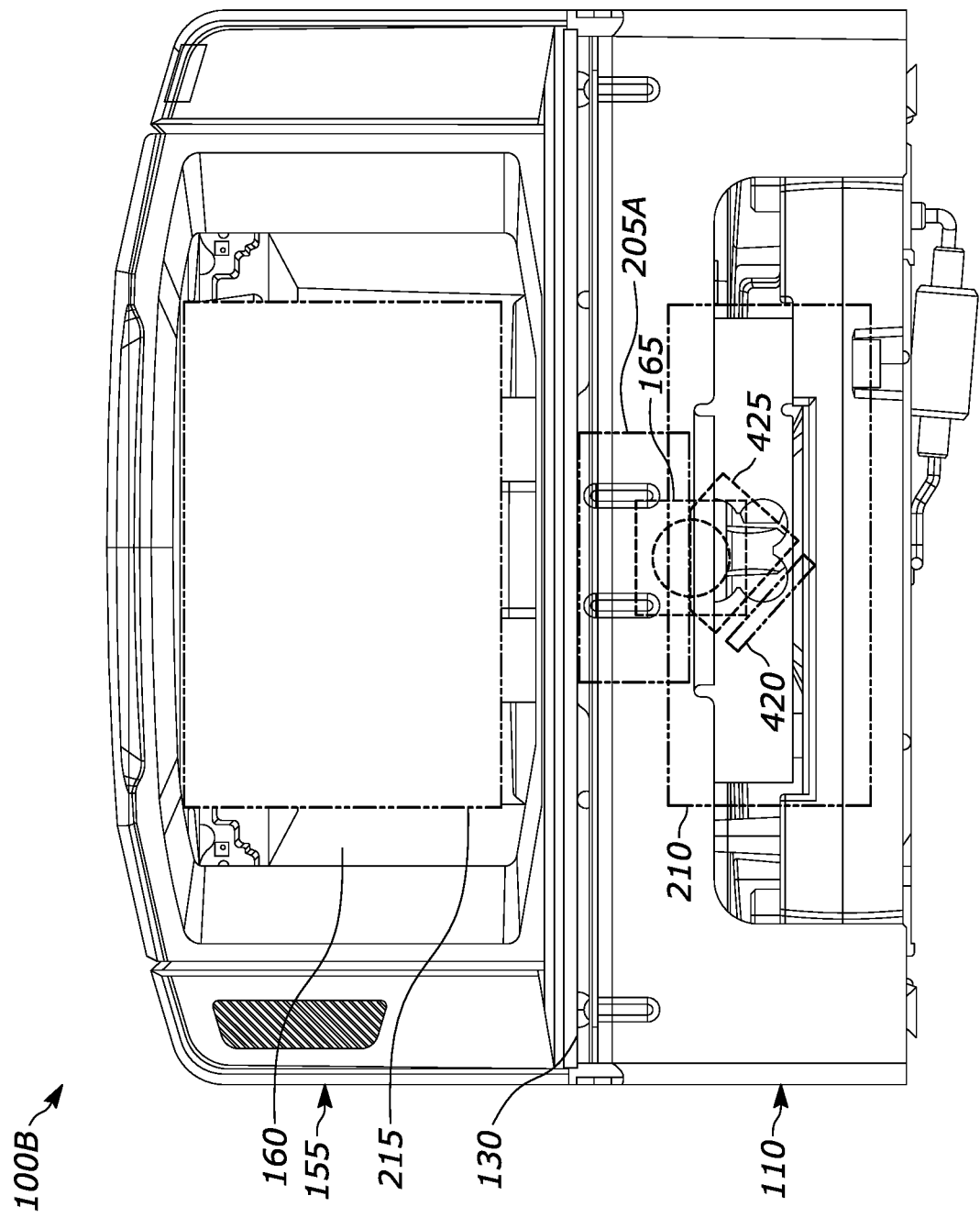
FIG. 7 illustrates a front view of the bioptic barcode reader of FIG. 6.

Referring to FIGS. 6-7, a second embodiment of bioptic barcode reader 100, designated 100B, is illustrated, which includes imaging assembly 165 and mirror arrangement 200A, described above, and a second example optical element arrangement 400.

Optical element arrangement 400 is positioned within housing 105 and is configured to rotate second portion 180 of primary FOV 170 by 90 degrees about central axis 185 of second portion 180 of primary FOV 170. Alternatively, or in addition to rotating second portion 180 of primary FOV 170, optical element arrangement 400 can also be configured to rotate first portion 175 of primary FOV by 90 degrees about a central axis of first portion 175.

As discussed above, rather than first mirror 205A being a planar mirror, as shown, and bioptic barcode reader 100B having only third mirror 215 in upper housing portion 155, first mirror 205A could be a concave or convex splitter mirror that splits first portion 175 of primary FOV 170 into two additional portions, directs one of the additional portions toward third mirror 215 and the other additional portion toward a fourth mirror in upper housing portion 155, which would provide two fields-of-view through upright window 160. In another example, bioptic barcode reader 100B could have two imaging assemblies, or an imaging assembly with two imagers, where the entire FOV of one imaging assembly (imager) is directed toward first mirror 205A and the entire FOV of the other imaging assembly (imager) is directed toward second mirror 210 and is rotated by optical element arrangement 400.

In the example shown, optical element arrangement 400 includes a first prism 405, a fourth mirror 420, and a second prism 425. First prism 405 has a diffractive entry surface 410, is positioned in a path of second portion 180 of primary FOV 170, and is configured to diffract second portion 180 towards fourth mirror 420. Fourth mirror 420 is configured to reflect second portion 180 of primary FOV 170 diffracted by first prism 405 towards second prism 425. Second prism 425 has a diffractive exit surface 430 and is configured to diffract second portion 180 of primary FOV 170 reflected by fourth mirror 420 towards second mirror 210.

To rotate second portion 180 of primary FOV 170 by 90 degrees about central axis 185, first prism 405 is positioned and oriented such that diffractive entry surface 410 is oriented at an angle 415 between 40 degrees and 50 degrees, preferably 45 degrees, relative to central axis 185 of second portion 180 of primary FOV 170 and second portion 180 passes through diffractive entry surface 410, second prism 425 is positioned and oriented such that diffractive exit surface 430 is oriented at an angle 435 between 40 and 50 degrees, preferably 45 degrees, relative to central axis 185 of second portion 180 reflected by fourth mirror 420, and fourth mirror 420 is positioned and oriented to reflect second portion 180 of primary FOV 170 diffracted by first prism 405 toward second prism 425. With first prism 405, fourth mirror 420, and second prism 425 positioned and oriented in this manner, second portion 180 of primary FOV 170 will enter first prism 405 through diffractive entry surface 410 and be diffracted towards fourth mirror 420, will be reflected off of fourth mirror 420 towards second prism 425, and will exit second prism 425 through diffractive exit surface 430 and be diffracted towards second mirror 210 rotated by 90 degrees relative to the orientation of second portion 180 when entering first prism 405.

Figure 8:
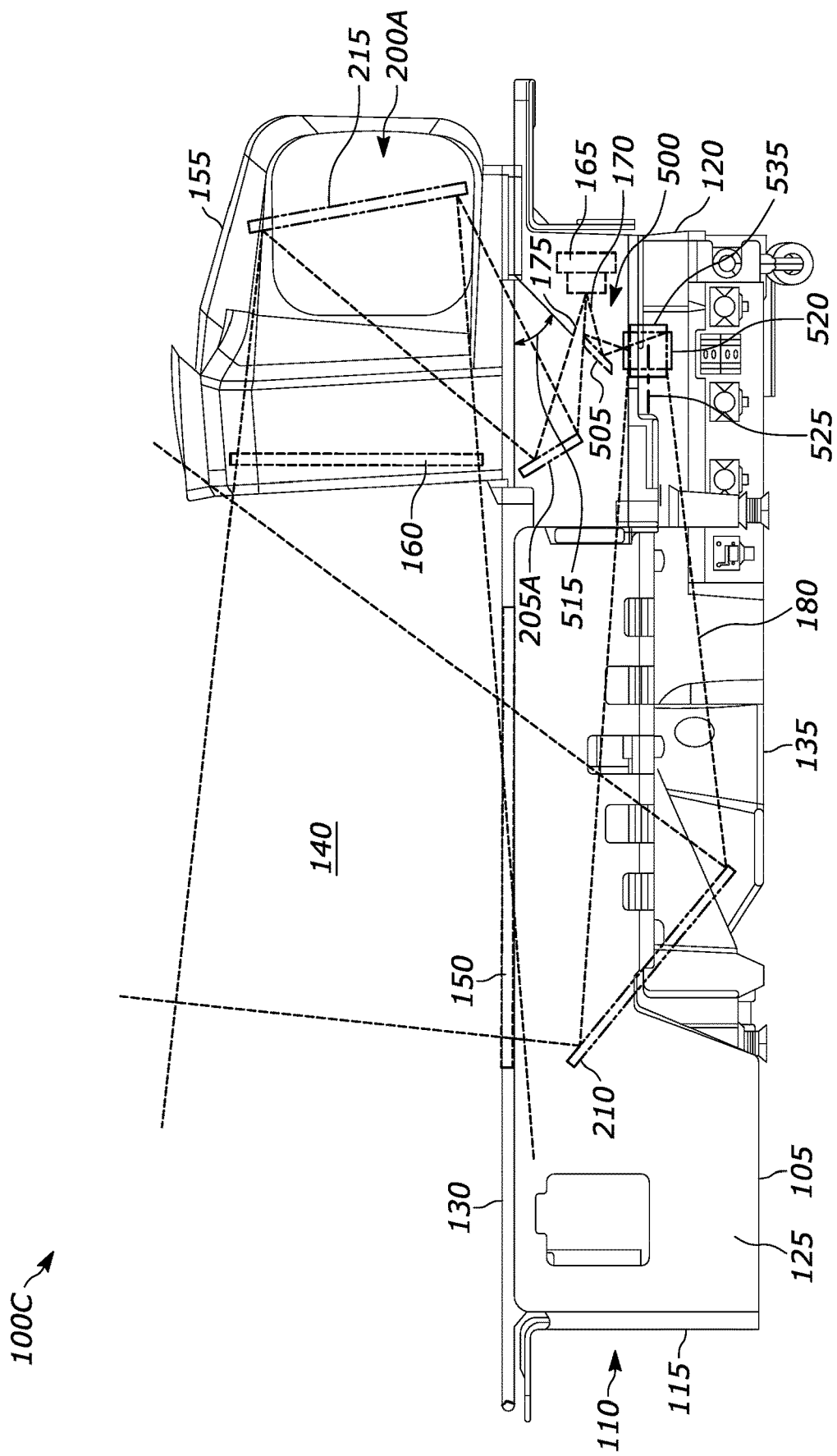
FIG. 8 illustrates a side view of a third embodiment of the bioptic barcode reader of FIG. 1.
Figure 9:
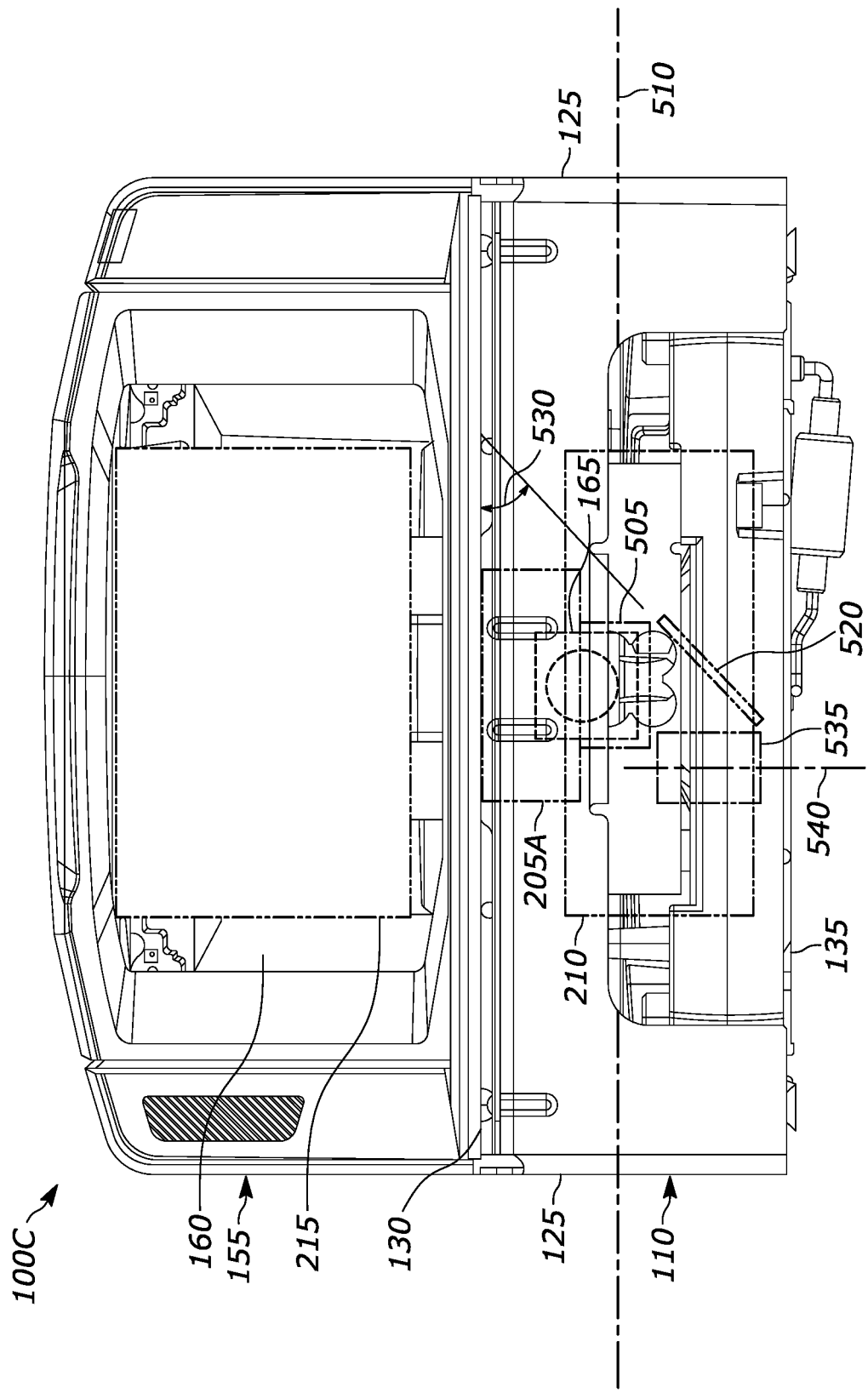
FIG. 9 illustrates a front view of the bioptic barcode reader of FIG. 8.
Figure 10:
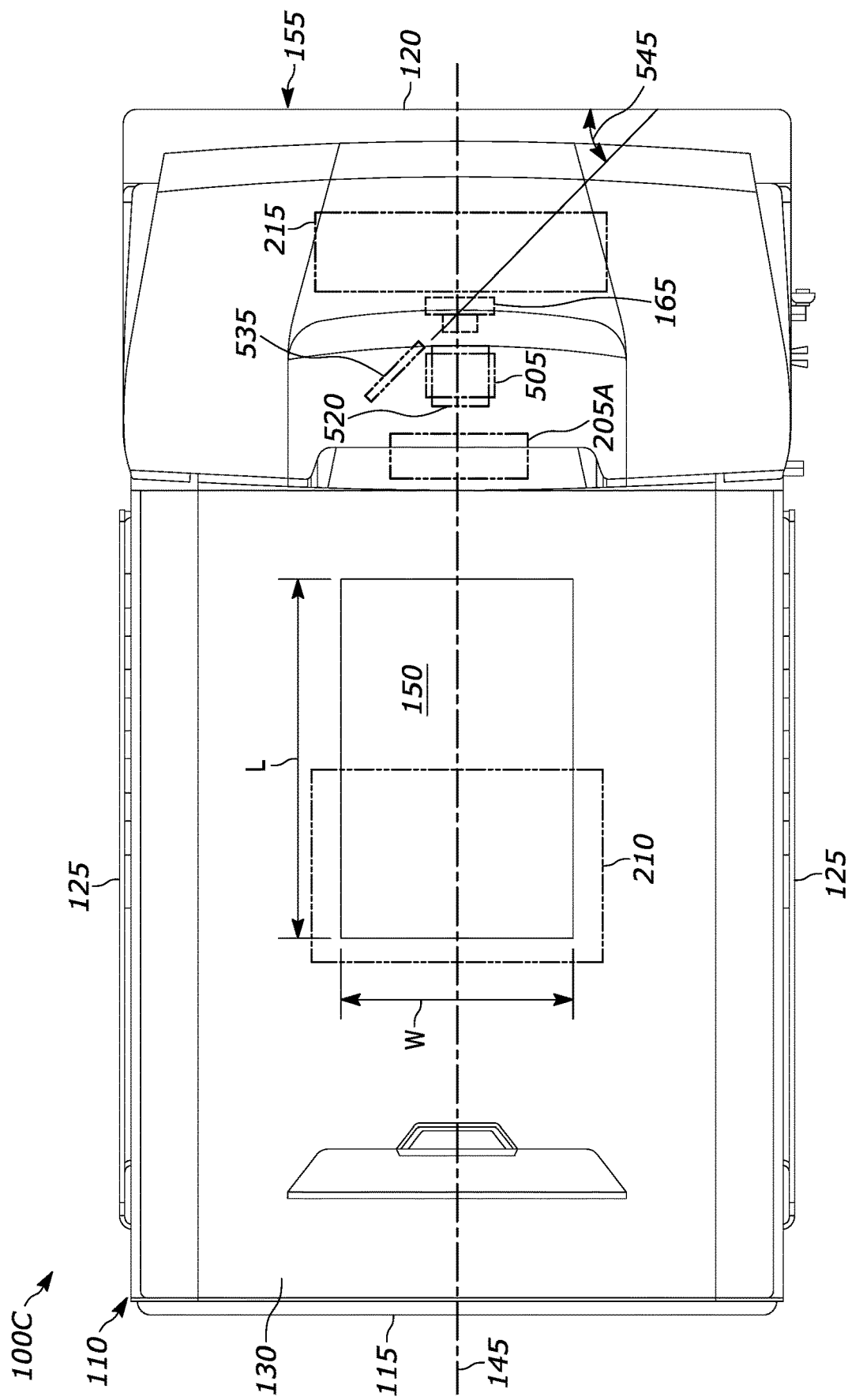
FIG. 10 illustrates a top view of the bioptic barcode reader of FIG. 8.
Figure 11:
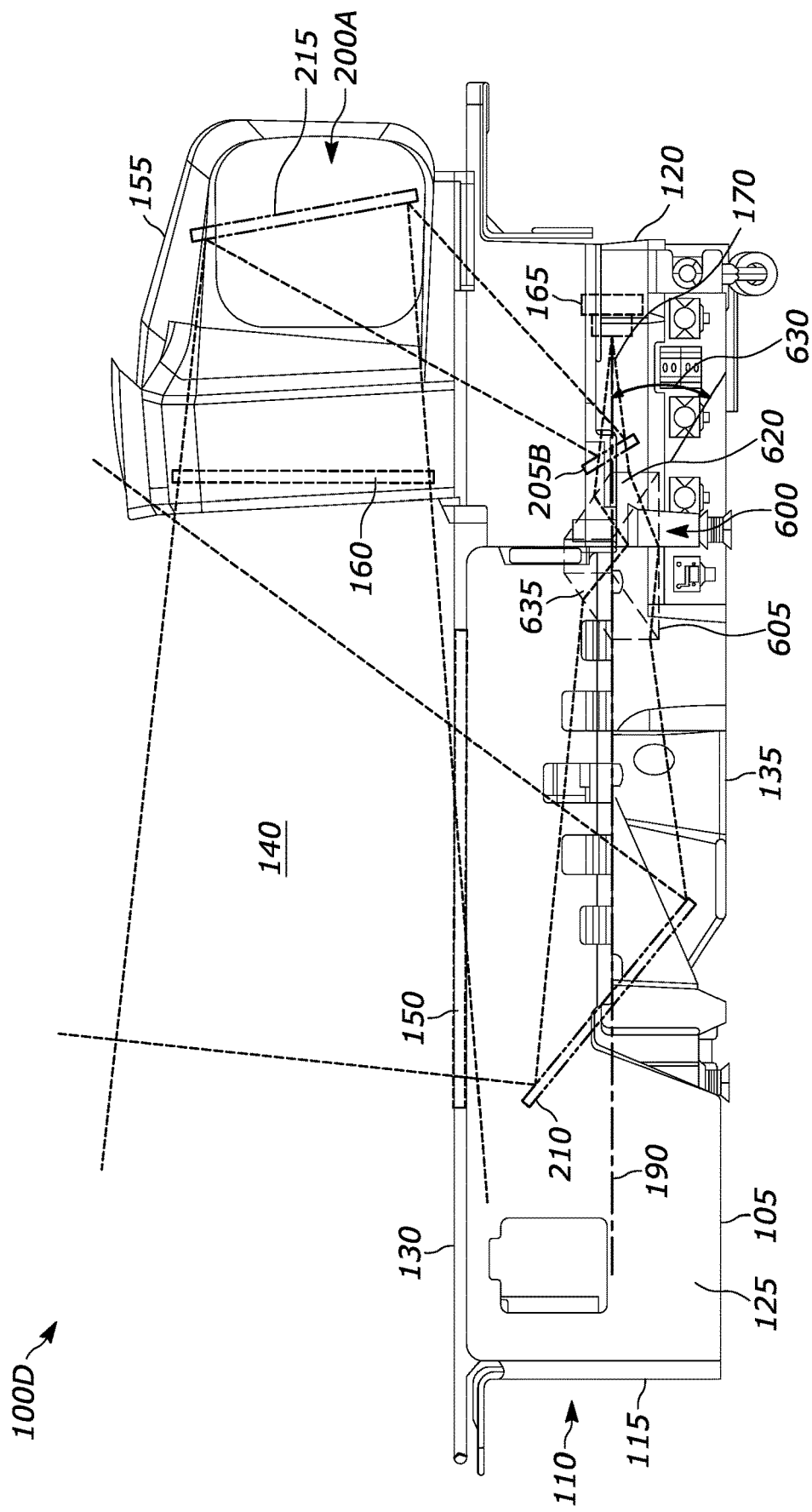
FIG. 11 illustrates a side view of a fourth embodiment of the bioptic barcode reader of FIG. 1.
Figure 12:
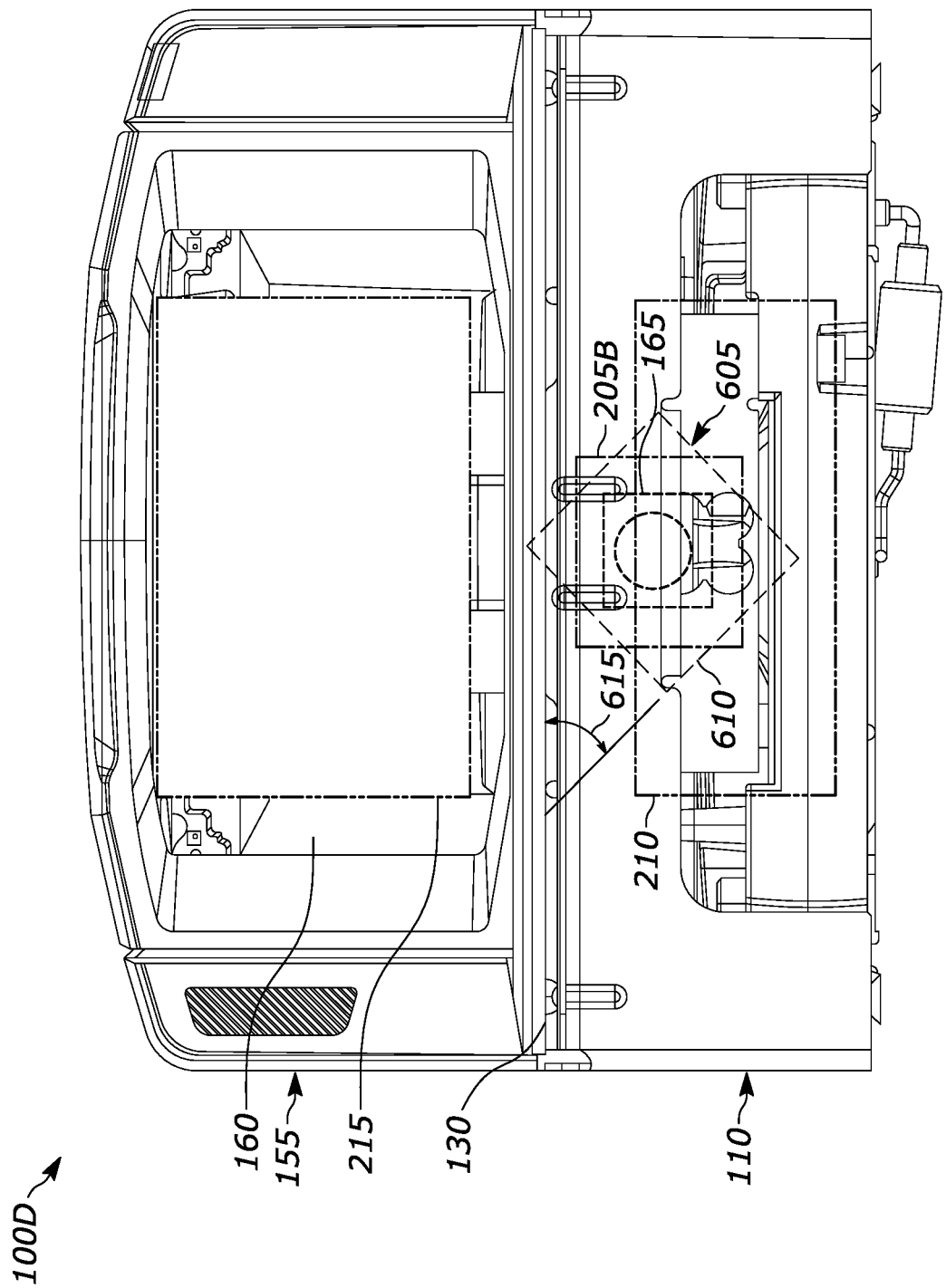
FIG. 12 illustrates a front view of the bioptic barcode reader of FIG. 11.
Figure 13:
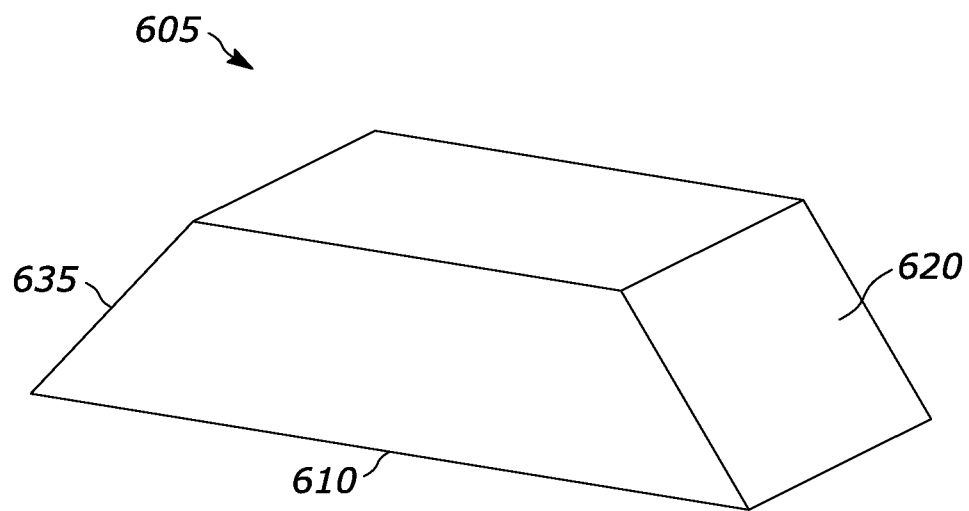
FIG. 13 illustrates a side perspective view of a dove prism of the bioptic barcode reader of FIG. 11.
Figure 14:
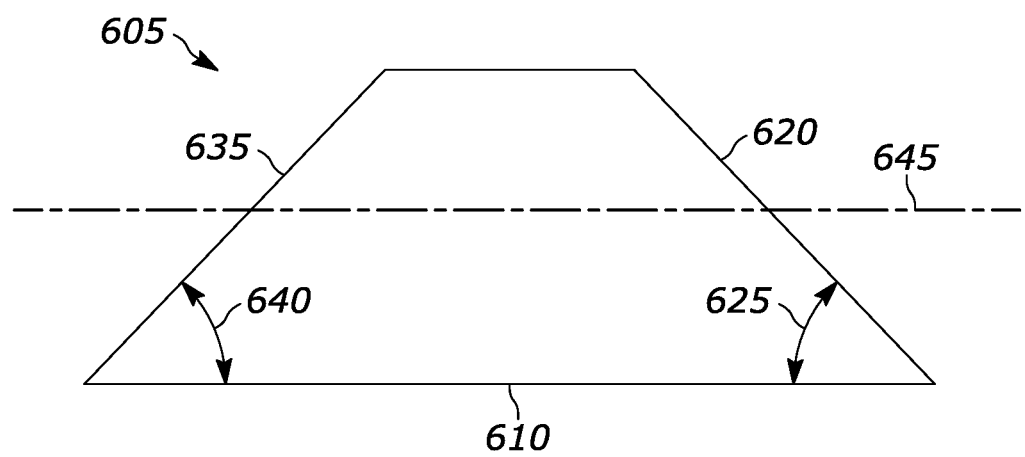
FIG. 14 illustrates a side view of the dove prism of FIG. 13.

Referring to FIGS. 8-10, a third embodiment of bioptic barcode reader 100, designated 100C, is illustrated, which includes imaging assembly 165 and mirror arrangement 200A, described above, and a third example optical element arrangement 500.

Optical element arrangement 500 is positioned within housing 105 and is configured to rotate second portion 180 of primary FOV 170 by 90 degrees about central axis 185 of second portion 180 of primary FOV 170. Alternatively, or in addition to rotating second portion 180 of primary FOV 170, optical element arrangement 500 can also be configured to rotate first portion 175 of primary FOV by 90 degrees about a central axis of first portion 175.

As discussed above, rather than first mirror 205A being a planar mirror, as shown, and bioptic barcode reader 100C having only third mirror 215 in upper housing portion 155, first mirror 205A could be a concave or convex splitter mirror that splits first portion 175 of primary FOV 170 into two additional portions, directs one of the additional portions toward third mirror 215 and the other additional portion toward a fourth mirror in upper housing portion 155, which would provide two fields-of-view through upright window 160. In another example, bioptic barcode reader 100C could have two imaging assemblies, or an imaging assembly with two imagers, where the entire FOV of one imaging assembly (imager) is directed toward first mirror 205A and the entire FOV of the other imaging assembly (imager) is directed toward second mirror 210 and is rotated by optical element arrangement 500.

In the example shown, optical element arrangement 500 includes a fifth mirror 505, a sixth mirror 520, and a seventh mirror 535. Fifth mirror 505 is positioned in a path of second portion 180 of primary FOV 170 and is configured to reflect second portion 180 towards sixth mirror 520. Sixth mirror 520 is configured to reflect second portion 180 of primary FOV 170 reflected by fifth mirror 505 towards seventh mirror 535. Seventh mirror 535 is configured to reflect second portion 180 of primary FOV 170 reflected by sixth mirror 520 towards second mirror 210.

To rotate second portion 180 of primary FOV 170 by 90 degrees about central axis 185, fifth mirror 505 is positioned and oriented rotated about a Z axis 510 that extends laterally between side walls 125 of lower housing portion 110 such that fifth mirror is oriented at an angle 515 of approximately 45 degrees relative to upper surface 130 of lower housing portion 110 and reflects second portion 180 of primary FOV 170 away from upper surface 130 and toward sixth mirror 520. Sixth mirror 520 is positioned and oriented rotated about an X axis 525 that extends longitudinally between a front wall 115 and a rear wall 120 of lower housing portion 110 such that sixth mirror 520 is oriented at an angle 530 of approximately 45 degrees relative to upper surface 130 and reflects second portion 180 of primary FOV 170 reflected by fifth mirror 505 laterally between side walls 125 of lower housing portion 110 towards seventh mirror 535. Seventh mirror 535 is positioned and oriented rotated about a Y axis 540 that extends vertically between upper surface 130 and a bottom wall 135 of lower housing portion 110 such that seventh mirror 535 is oriented at an angle 545 between 40 degrees and 50 degrees, preferably 45 degrees, relative to rear wall 120 of lower housing portion 110 and reflects second portion 180 of primary FOV 170 reflected by sixth mirror 520 away from rear wall 120 and toward second mirror 210. With fifth mirror 505, sixth mirror 520, and seventh mirror 535 positioned and oriented in this manner, second portion 180 of primary FOV 170 will reflect off of fifth mirror 505 toward sixth mirror 520, reflect off of sixth mirror 520 toward seventh mirror 535, and reflect off of seventh mirror 535 toward second mirror 210 rotated by 90 degrees relative to the orientation of second portion 180 before reflecting off of fifth mirror 505.

Alternatively, rather than fifth mirror 505 being rotated around Z axis 510 as described above, fifth mirror 505 could also be rotated around X axis 525 or Y axis 540 and sixth mirror 520 and seventh mirror 535 would then be rotated around different axes depending on the rotation of fifth mirror 505. Any combination of rotations could work as long as the relative positions of fifth mirror 505, sixth mirror 520, and seventh mirror 535 are positioned and oriented relative to each other as described above.

Referring to FIGS. 11-14, a fourth embodiment of bioptic barcode reader 100, designated 100D, is illustrated, which includes imaging assembly 165, a second example mirror arrangement 200B, and a fourth example optical element arrangement 600.

Mirror arrangement 200B is positioned within housing 105 and includes at least one of a transflective or dichroic mirror 205B, second mirror 210, and third mirror 215. As used herein, a transflective mirror is a mirror configured to allow primary FOV 170 of imaging assembly 165 to pass through the transflective mirror with the transflective mirror in a transmissive state and to reflect primary FOV 170 with the transflective mirror in a reflective state and a dichroic mirror is a mirror configured to allow a portion of primary FOV 170 having a second wavelength to pass through the dichroic mirror and to reflect a portion of primary FOV 170 having a first wavelength. Transflective/dichroic mirror 205B is positioned within housing 105 in a path of primary FOV 170. Second mirror 210 is configured to redirect primary FOV 170 that passes through transflective/dichroic mirror 205B through horizontal window 150. Third mirror 215 is configured to redirect primary FOV 170 that is reflected by transflective/dichroic mirror 205B through upright window 160.

Optical element arrangement 600 is positioned within housing 105 between transflective/dichroic mirror 205 and second mirror 210 and is configured to rotate primary FOV 170 that passes through transflective/dichroic mirror 205B by 90 degrees about a central axis 190 of primary FOV 170. Alternatively, or in addition to rotating primary FOV 170 that passes through transflective/dichroic mirror 205B, optical element arrangement 600 can also be configured to rotate primary FOV that is reflected by transflective/dichroic mirror 205B by 90 degrees about central axis 190. Rotation of primary FOV 170 that passes through transflective/dichroic mirror 205B allows horizontal window 150 to be rotated such that the greater length L of horizontal window 150 is oriented generally parallel to longitudinal axis 145 of lower housing portion 110 and the smaller width W of horizontal window 150 is oriented generally parallel to longitudinal axis 145. This orientation of horizontal window 150 provides a larger longitudinal distance for items to be swiped across horizontal window 150 while allowing a greater portion of primary FOV 170 of imaging assembly 165 to pass through horizontal window 150.

In the example shown, optical element arrangement 600 includes a dove prism 605 having a reflective bottom surface 610, a diffractive entry surface 620, and diffractive exit surface 635 opposite diffractive entry surface 620. Reflective bottom surface 610 can be a total internal reflective surface or can be a mirror surface that is applied to the bottom surface of dove prism 605. Diffractive entry surface 620 extends from reflective bottom surface 610 at an angle 625 between 40 degrees and 50 degrees, preferably 45 degrees, to reflective bottom surface 610 and diffractive exit surface 635 extends from reflective bottom surface 610 at an angle 640 between 40 degrees and 50 degrees, preferably 45 degrees, to reflective bottom surface 610.

To rotate primary FOV 170 that passes through transflective/dichroic mirror 205B by 90 degrees about central axis 190, dove prism 605 is rotated between 40 degrees and 50 degrees, preferably 45 degrees, about a longitudinal axis 645 of dove prism 605 such that reflective bottom surface 610 is oriented at an angle 615 between 40 degrees and 50 degrees, preferably 45 degrees, relative to upper surface 130 of lower housing portion 110. Dove prism 605 is also positioned such that diffractive entry surface 620 is oriented at an angle 630 between 40 degrees and 50 degrees, preferably 45 degrees, relative to central axis 190 of primary FOV 170. With dove prism 605 positioned and oriented in this manner, primary FOV 170 that passes through transflective/dichroic mirror 205B will enter dove prism 605 through diffractive entry surface 620 and be diffracted towards reflective bottom surface 610, will be reflected off of reflective bottom surface 610 towards diffractive exit surface 635, and will exit dove prism 605 through diffractive exit surface 635 and be diffracted towards second mirror 210 rotated by 90 degrees relative to the orientation of primary FOV 170 when entering dove prism 605.

Figure 15:
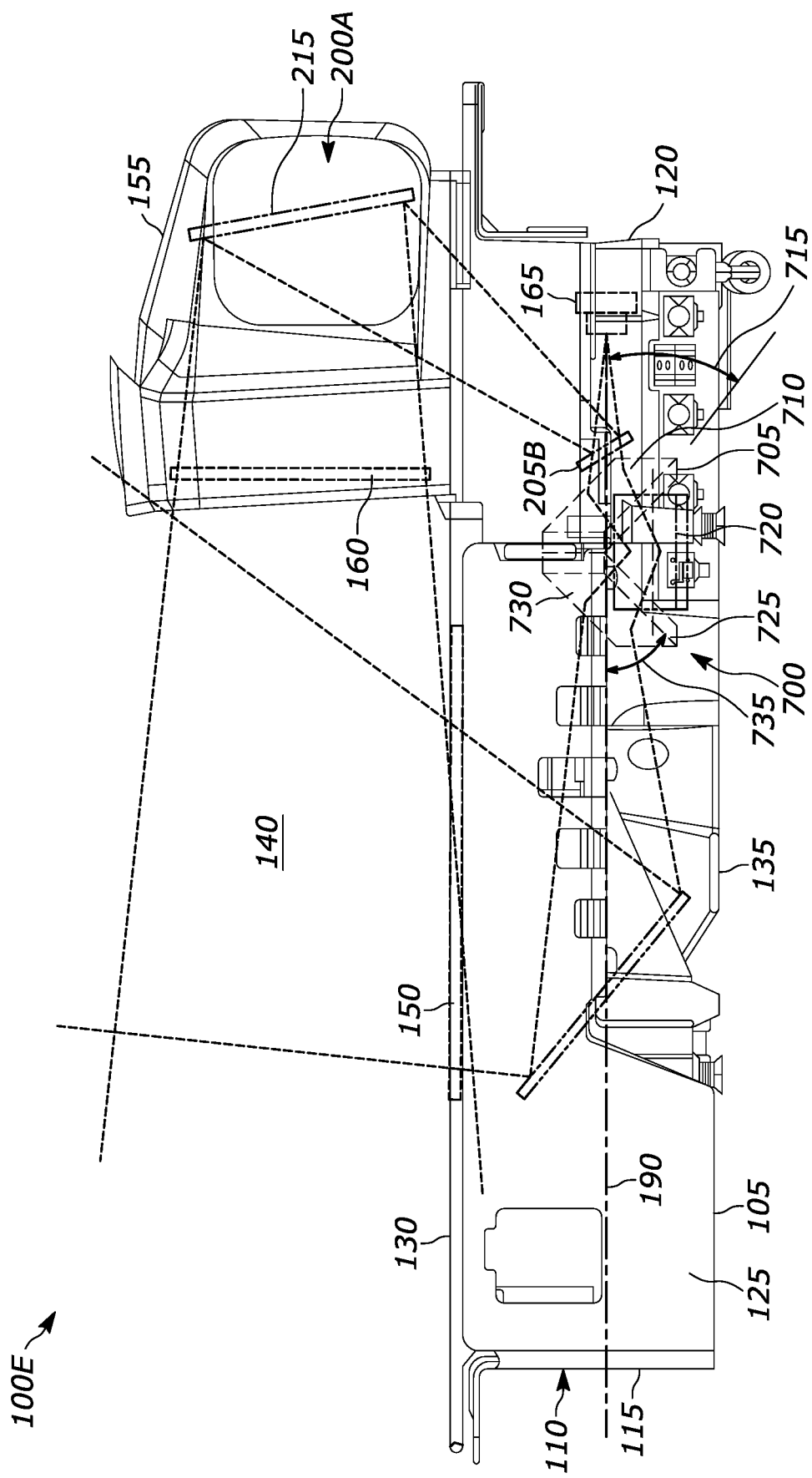
FIG. 15 illustrates a side view of a fifth embodiment of the bioptic barcode reader of FIG. 1.
Figure 16:
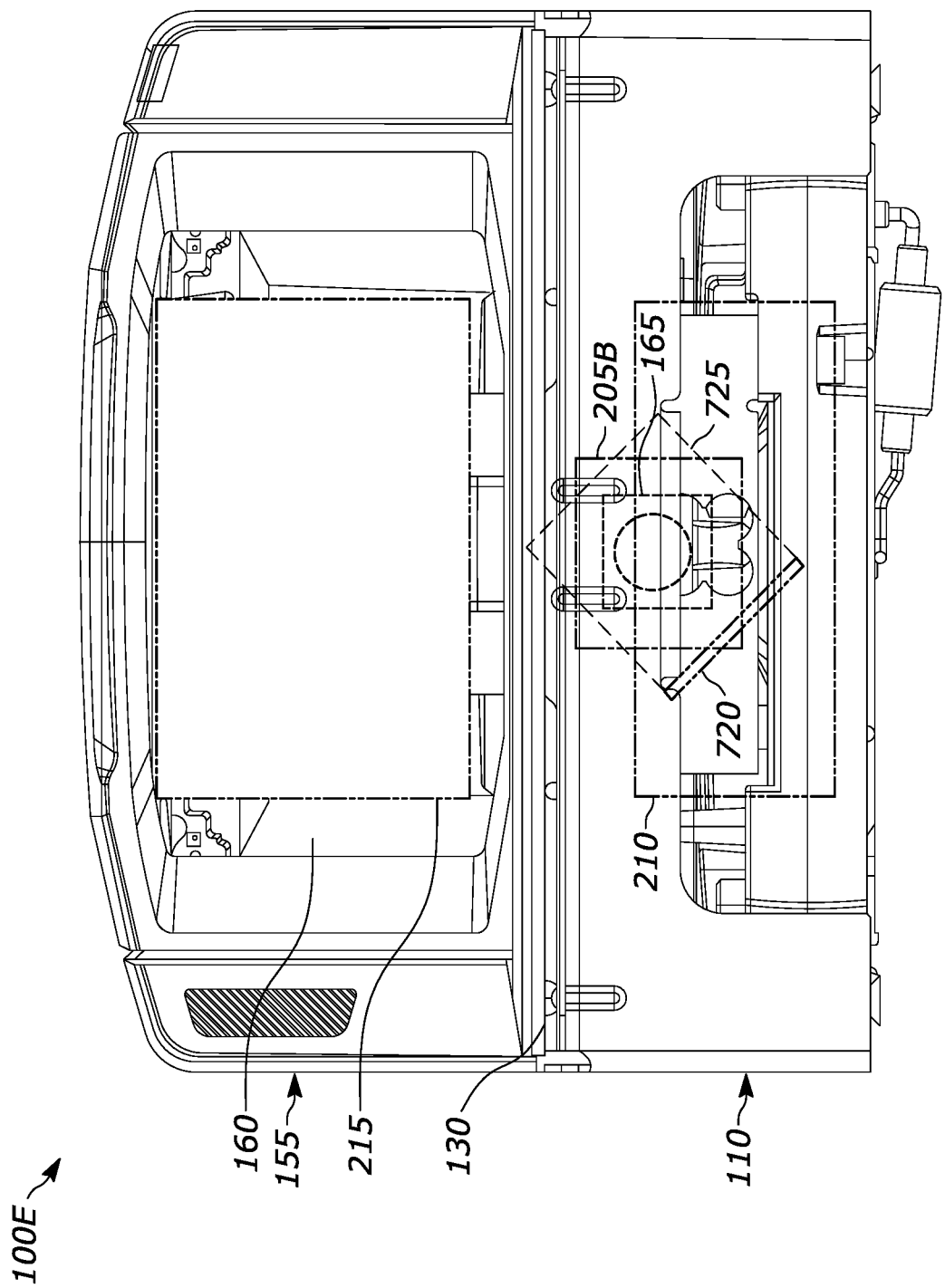
FIG. 16 illustrates a front view of the bioptic barcode reader of FIG. 15.

Referring to FIGS. 15-16, a fifth embodiment of bioptic barcode reader 100, designated 100E, is illustrated, which includes imaging assembly 165 and mirror arrangement 200B, described above, and a fifth example optical element arrangement 700.

Optical element arrangement 700 is positioned within housing 105 and is configured to rotate primary FOV 170 that passes through transflective/dichroic mirror 205B by 90 degrees about central axis 190 of primary FOV 170. Alternatively, or in addition to rotating primary FOV 170 that passes through transflective/dichroic mirror 205B, optical element arrangement 700 can also be configured to rotate primary FOV that is reflected by transflective/dichroic mirror 205B by 90 degrees about central axis 190.

In the example shown, optical element arrangement 700 includes a first prism 705, a fourth mirror 720, and a second prism 725. First prism 705 has a diffractive entry surface 710, is positioned in a path of primary FOV 170 that passes through transflective/dichroic mirror 205B, and is configured to diffract primary FOV 170 that passes through transflective/dichroic mirror 205B towards fourth mirror 720. Fourth mirror 720 is configured to reflect primary FOV 170 that passes through transflective/dichroic mirror 205B and is diffracted by first prism 705 towards second prism 725. Second prism 725 has a diffractive exit surface 730 and is configured to diffract primary FOV 170 that passes through transflective/dichroic mirror 205B and is reflected by fourth mirror 720 towards second mirror 210.

To rotate primary FOV 170 that passes through transflective/dichroic mirror 205B by 90 degrees about central axis 190, first prism 705 is positioned and oriented such that diffractive entry surface 710 is oriented at an angle 715 between 40 degrees and 50 degrees, preferably 45 degrees, relative to central axis 190 of primary FOV 170 and primary FOV 170 passes through diffractive entry surface 710, second prism 725 is positioned and oriented such that diffractive exit surface 730 is oriented at an angle 735 between 40 and 50 degrees, preferably 45 degrees, relative to central axis 190 reflected by fourth mirror 720, and fourth mirror 720 is positioned and oriented to reflect primary FOV 170 that passes through transflective/dichroic mirror 205B diffracted by first prism 705 toward second prism 725. With first prism 705, fourth mirror 720, and second prism 725 positioned and oriented in this manner, primary FOV 170 that passes through transflective/dichroic mirror 205B will enter first prism 705 through diffractive entry surface 710 and be diffracted towards fourth mirror 720, will be reflected off of fourth mirror 720 towards second prism 725, and will exit second prism 725 through diffractive exit surface 730 and be diffracted towards second mirror 210 rotated by 90 degrees relative to the orientation of primary FOV 170 when entering first prism 705.

Figure 17:
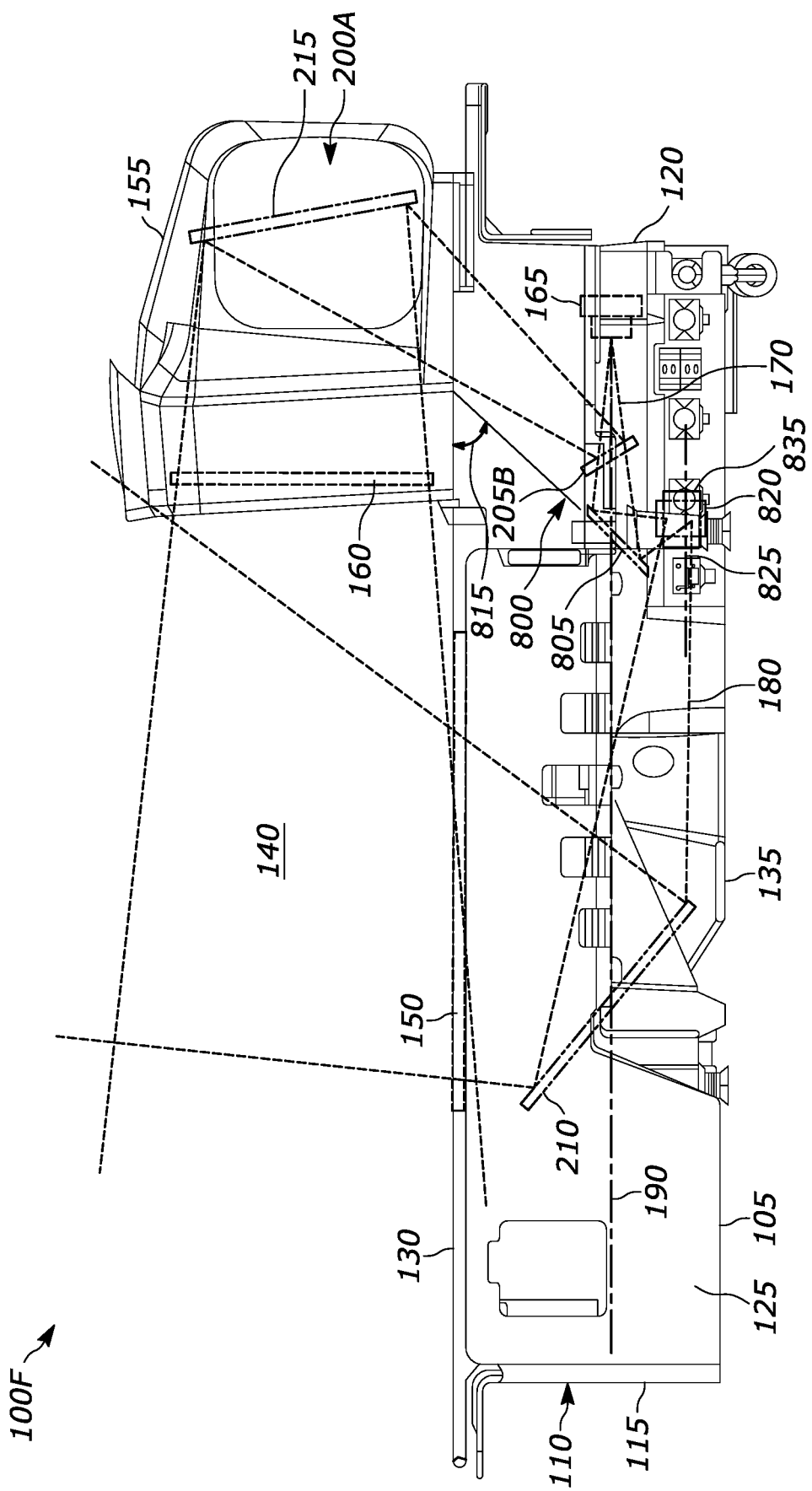
FIG. 17 illustrates a side view of a sixth embodiment of the bioptic barcode reader of FIG. 1.
Figure 18:
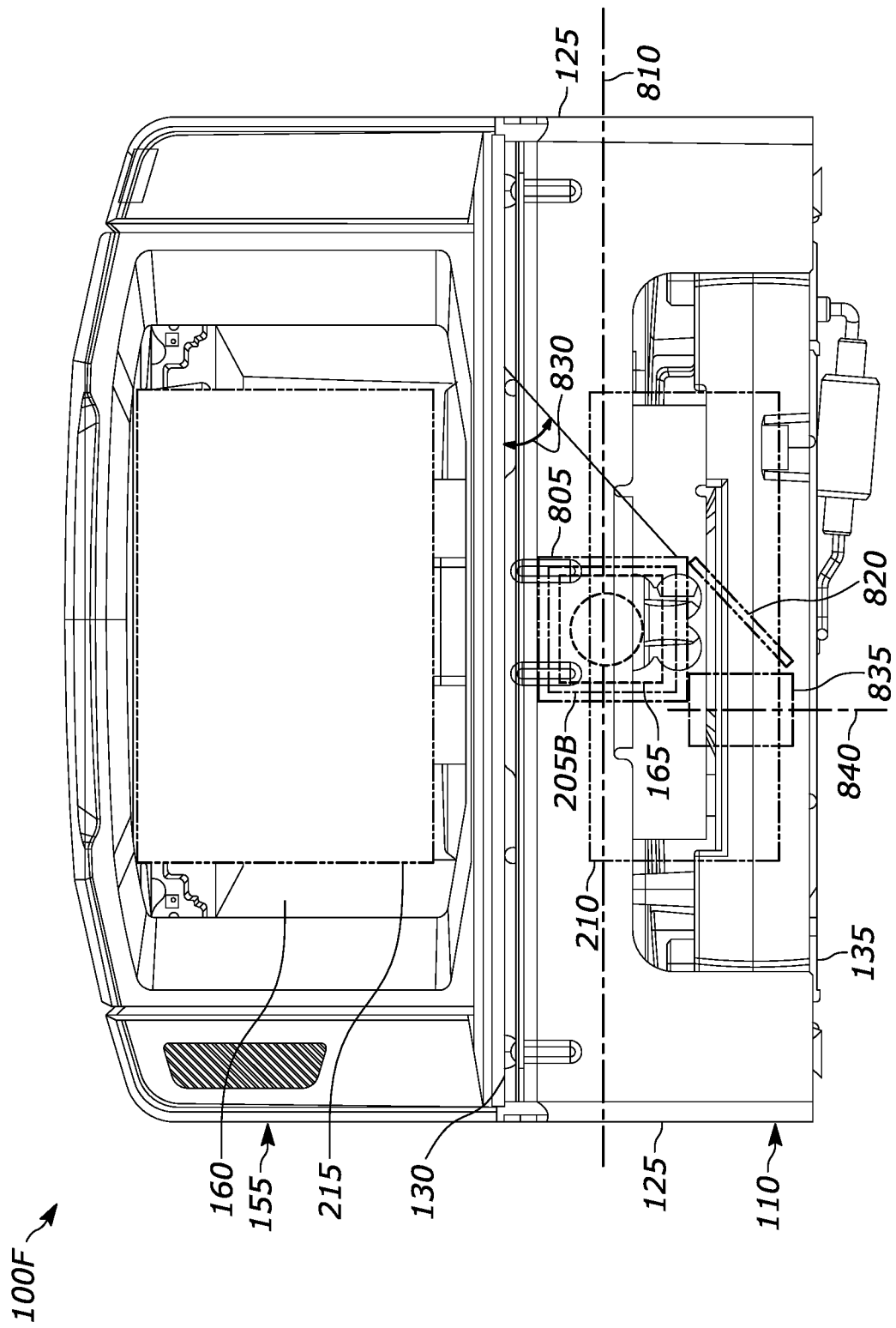
FIG. 18 illustrates a front view of the bioptic barcode reader of FIG. 17.
Figure 19:
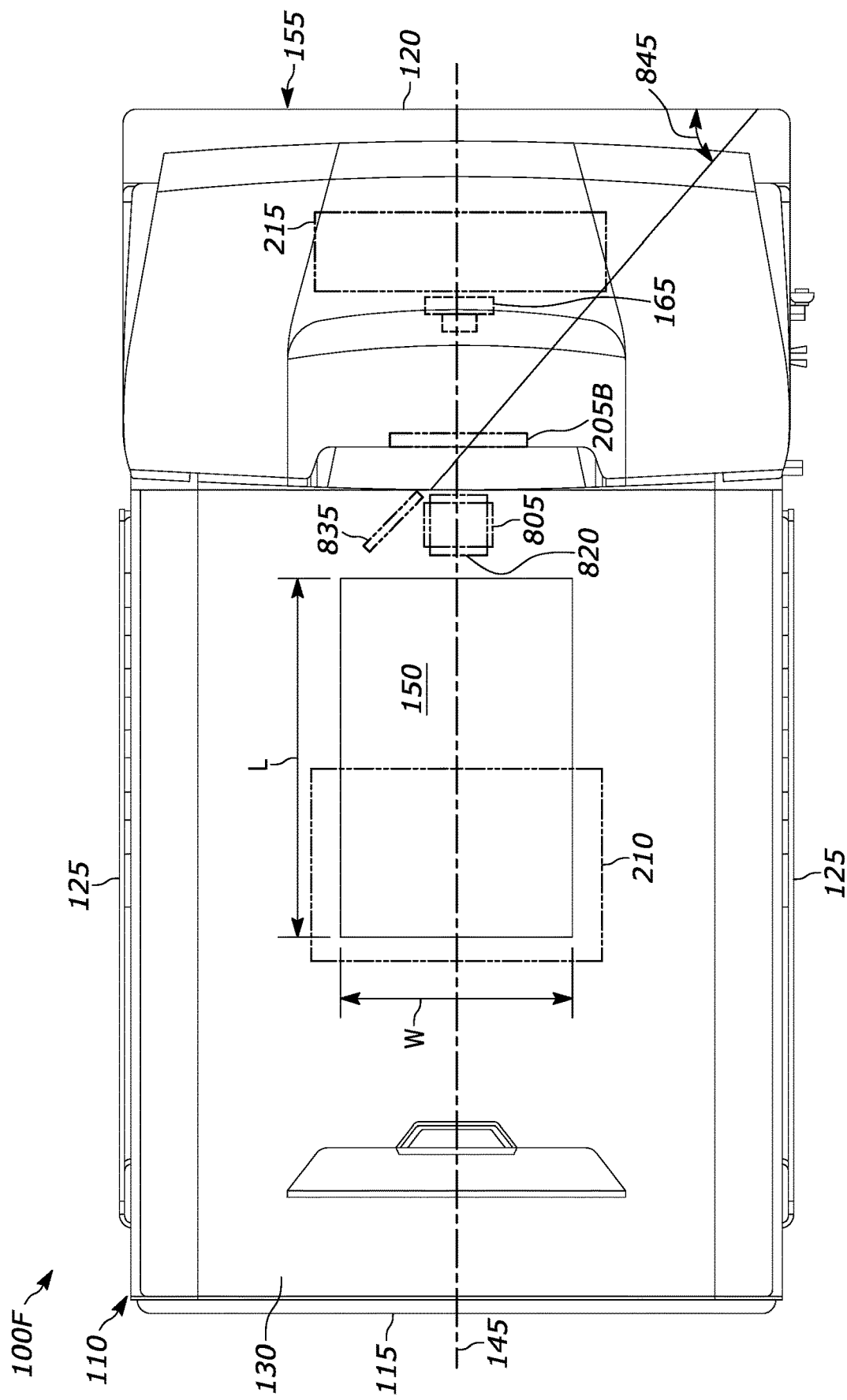
FIG. 19 illustrates a top view of the bioptic barcode reader of FIG. 17.

Referring to FIGS. 17-19, a sixth embodiment of bioptic barcode reader 100, designated 100F, is illustrated, which includes imaging assembly 165 and mirror arrangement 200B, described above, and a sixth example optical element arrangement 800.

Optical element arrangement 800 is positioned within housing 105 and is configured to rotate primary FOV 170 that passes through transflective/dichroic mirror 205B by 90 degrees about central axis 190 of primary FOV 170. Alternatively, or in addition to rotating primary FOV 170 that passes through transflective/dichroic mirror 205B, optical element arrangement 800 can also be configured to rotate primary FOV that is reflected by transflective/dichroic mirror 205B by 90 degrees about central axis 190.

In the example shown, optical element arrangement 800 includes a fifth mirror 805, a sixth mirror 820, and a seventh mirror 835. Fifth mirror 805 is positioned in a path of primary FOV 170 that passes through transflective/dichroic mirror 205B and is configured to reflect primary FOV 170 that passes through transflective/dichroic mirror 205B towards sixth mirror 820. Sixth mirror 820 is configured to reflect primary FOV 170 that passes through transflective/dichroic mirror 205B and is reflected by fifth mirror 805 towards seventh mirror 835. Seventh mirror 835 is configured to reflect primary FOV 170 that passes through transflective/dichroic mirror 205B and is reflected by sixth mirror 820 towards second mirror 210.

To rotate primary FOV 170 that passes through transflective/dichroic mirror 205B by 90 degrees about central axis 190, fifth mirror 805 is positioned and oriented rotated about a Z axis 810 that extends laterally between side walls 125 of lower housing portion 110 such that fifth mirror 805 is oriented at an angle 815 of approximately 45 degrees relative to upper surface 130 of lower housing portion 110 and reflects primary FOV 170 that passes through transflective/dichroic mirror 205B away from upper surface 130 and toward sixth mirror 820. Sixth mirror 820 is positioned and oriented rotated about an X axis 825 that extends longitudinally between a front wall 115 and a rear wall 120 of lower housing portion 110 such that sixth mirror 820 is oriented at an angle 830 of approximately 45 degrees relative to upper surface 130 and reflects primary FOV 170 that passes through transflective/dichroic mirror 205B and is reflected by fifth mirror 805 laterally between side walls 125 of lower housing portion 110 towards seventh mirror 835. Seventh mirror 835 is positioned and oriented rotated about a Y axis 840 that extends vertically between upper surface 130 and a bottom wall 135 of lower housing portion 110 such that seventh mirror 835 is oriented at an angle 845 between 40 degrees and 50 degrees, preferably 45 degrees, relative to rear wall 120 of lower housing portion 110 and reflects primary FOV 170 that passes through transflective/dichroic mirror 205B and is reflected by sixth mirror 820 away from rear wall 120 and toward second mirror 210. With fifth mirror 805, sixth mirror 820, and seventh mirror 835 positioned and oriented in this manner, primary FOV 170 that passes through transflective/dichroic mirror 205B will reflect off of fifth mirror 805 toward sixth mirror 820, reflect off of sixth mirror 820 toward seventh mirror 835, and reflect off of seventh mirror 835 toward second mirror 210 rotated by 90 degrees relative to the orientation of primary FOV 170 before reflecting off of fifth mirror 805.

Alternatively, rather than fifth mirror 805 being rotated around Z axis 810 as described above, fifth mirror 805 could also be rotated around X axis 825 or Y axis 840 and sixth mirror 820 and seventh mirror 835 would then be rotated around different axes depending on the rotation of fifth mirror 805. Any combination of rotations could work as long as the relative positions of fifth mirror 805, sixth mirror 820, and seventh mirror 835 are positioned and oriented relative to each other as described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A bioptic barcode reader, comprising:
a housing having a lower housing portion with an upper surface facing a product scanning region and an upper housing portion extending above the lower housing portion;
a generally horizontal window positioned at the upper surface of the lower housing portion and a generally upright window positioned in the upper housing portion;
an imaging assembly positioned within the housing, the imaging assembly having a primary field-of-view (FOV);
a first mirror positioned within the housing, the first mirror configured to redirect a first portion of the primary FOV towards the upper housing portion; and
an optical element arrangement positioned within the housing, the optical element arrangement configured to rotate a second portion of the primary FOV, separate from the first portion of the primary FOV, about 90 degrees about a central axis of the second portion of the primary FOV.

2. The bioptic barcode reader of claim 1, comprising a second mirror and a third mirror, wherein the first mirror is configured to redirect the first portion of the primary FOV towards the third mirror, the second mirror is configured to redirect the second portion of the primary FOV through the generally horizontal window, and the third mirror is configured to redirect the first portion of the primary FOV through the generally upright window.

3. The bioptic barcode reader of claim 1, wherein a length of the generally horizontal window is greater than a width of the generally horizontal window and the generally horizontal window is positioned such that the length is generally parallel to a longitudinal axis of the lower housing portion and the width extends generally perpendicular to the longitudinal axis of the lower housing portion.

4. The bioptic barcode reader of claim 1, wherein the optical element arrangement comprises a dove prism.

5. The bioptic barcode reader of claim 4, wherein:
the dove prism comprises a reflective bottom surface, a diffractive entry surface extending from the reflective bottom surface at an angle between 40 degrees and 50 degrees to the reflective bottom surface, and a diffractive exit surface extending from the reflective bottom surface at an angle between 40 degrees and 50 degrees to the reflective bottom surface, the diffractive exit surface being opposite the diffractive entry surface;
the dove prism is rotated between 40 degrees and 50 degrees about a longitudinal axis of the dove prism such that the reflective bottom surface is oriented at an angle to the upper surface of the lower housing portion between 40 degrees and 50 degrees; and
the dove prism is positioned such that the diffractive entry surface is oriented at an angle between 40 degrees and 50 degrees relative to the central axis of the second portion of the primary FOV and the second portion of the primary FOV passes through the diffractive entry surface.

6. The bioptic barcode reader of claim 5, wherein the reflective bottom surface is a total internal reflective surface.

7. The bioptic barcode reader of claim 5, wherein the reflective bottom surface is a mirror surface applied to a bottom surface of the dove prism.

8. The bioptic barcode reader of claim 1, wherein:
the optical element arrangement comprises a first prism, a fourth mirror, and a second prism;

the first prism is positioned in a path of the second portion of the primary FOV and is configured to diffract the second portion of the primary FOV towards the fourth mirror;
the fourth mirror is configured to reflect the second portion of the primary FOV diffracted by the first prism towards the second prism; and
the second prism is configured to diffract the second portion of the primary FOV reflected by the fourth mirror.

9. The bioptic barcode reader of claim 8, wherein:
the first prism comprises a diffractive entry surface and the first prism is positioned and oriented such that the diffractive entry surface is oriented at an angle between 40 degrees and 50 degrees relative to the central axis of the second portion of the primary FOV and the second portion of the primary FOV passes through the diffractive entry surface; and
the second prism comprises a diffractive exit surface and the second prism is positioned and oriented such that the diffractive exit surface is oriented at an angle between 40 degrees and 50 degrees relative to the central axis of the second portion of the primary FOV.

10. The bioptic barcode reader of claim 1, wherein:
the optical element arrangement comprises a fifth mirror, a sixth mirror, and a seventh mirror;
the fifth mirror is positioned in a path of the second portion of the primary FOV and is configured to reflect the second portion of the primary FOV towards the sixth mirror;
the sixth mirror is configured to reflect the second portion of the primary FOV reflected by the fifth mirror towards the seventh mirror; and
the seventh mirror is configured to reflect the second portion of the primary FOV reflected by the sixth mirror.

11. The bioptic barcode reader of claim 10, wherein:
the fifth mirror is rotated about a Z axis that extends laterally between side walls of the lower housing portion such that the fifth mirror is oriented at a 45 degree angle relative to the upper surface and reflects the second portion of the primary FOV away from the upper surface of the lower housing portion;
the sixth mirror is rotated about a X axis that extends longitudinally between a front wall and a rear wall of the lower housing portion such that the sixth mirror is oriented at a 45 degree angle relative to the upper surface and reflects the second portion of the primary FOV reflected by the fifth mirror laterally between the side walls of the lower housing portion; and
the seventh mirror is rotated about a Y axis that extends vertically between the upper surface and a bottom wall of the lower housing portion such that the seventh mirror is oriented at an angle between 40 degrees and 50 degrees relative to a rear wall of the lower housing portion and reflects the second portion of the primary FOV reflected by the sixth mirror away from the rear wall of the lower housing portion.

12. A bioptic barcode reader, comprising:
a housing having a lower housing portion with an upper surface facing a product scanning region and an upper housing portion extending above the lower housing portion;
a generally horizontal window positioned at the upper surface of the lower housing portion and a generally upright window positioned in the upper housing portion;
an imaging assembly positioned within the housing, the imaging assembly having a primary field-of-view (FOV);
a mirror arrangement positioned within the housing, the mirror arrangement including at least one of a transflective mirror and a dichroic mirror, a second mirror, and a third mirror, wherein the transflective mirror or dichroic mirror is positioned in a path of the primary FOV, the second mirror is configured to redirect the primary FOV through the generally horizontal window, and the third mirror is configured to redirect the primary FOV through the generally upright window; and
an optical element arrangement positioned within the housing, the optical element arrangement configured to rotate the primary FOV by 90 degrees about a central axis of the primary FOV.

13. The bioptic barcode reader of claim 12, wherein the optical element arrangement is positioned between the transflective mirror or dichroic mirror and the second mirror.

14. The bioptic barcode reader of claim 12, wherein a length of the generally horizontal window is greater than a width of the generally horizontal window and the generally horizontal window is positioned such that the length is generally parallel to a longitudinal axis of the lower housing portion and the width extends generally perpendicular to the longitudinal axis of the lower housing portion.

15. The bioptic barcode reader of claim 12, wherein the optical element arrangement comprises a dove prism.

16. The bioptic barcode reader of claim 15, wherein:
the dove prism comprises a reflective bottom surface, a diffractive entry surface extending from the reflective bottom surface at an angle between 40 degrees and 50 degrees to the reflective bottom surface, and a diffractive exit surface extending from the reflective bottom surface at an angle between 40 degrees and 50 degrees to the reflective bottom surface, the diffractive exit surface being opposite the diffractive entry surface;
the dove prism is rotated between 40 degrees and 50 degrees about a longitudinal axis of the dove prism such that the reflective bottom surface is oriented at an angle to the upper surface of the lower housing portion between 40 degrees and 50 degrees; and
the dove prism is positioned such that the diffractive entry surface is oriented at an angle between 40 degrees and 50 degrees relative to the central axis of the primary FOV and the primary FOV that passes through the transflective mirror passes through the diffractive entry surface.

17. The bioptic barcode reader of claim 16, wherein the reflective bottom surface is a total internal reflective surface.

18. The bioptic barcode reader of claim 16, wherein the reflective bottom surface is a mirror surface applied to a bottom surface of the dove prism.

19. The bioptic barcode reader of claim 12, wherein:
the optical element arrangement comprises a first prism, a fourth mirror, and a second prism;
the first prism is positioned in a path of the primary FOV that passes through the transflective mirror and is configured to diffract the primary FOV that passes through the transflective mirror towards the third mirror;
the third mirror is configured to reflect the primary FOV diffracted by the first prism towards the second prism; and
the second prism is configured to diffract the primary FOV reflected by the third mirror towards the second mirror.

20. The bioptic barcode reader of claim 19, wherein:

the first prism comprises a diffractive entry surface and the first prism is positioned and oriented such that the diffractive entry surface is oriented at an angle between 40 degrees and 50 degrees relative to the central axis of the primary FOV and the primary FOV that passes through the transflective mirror passes through the diffractive entry surface; and the second prism comprises a diffractive exit surface and the second prism is positioned and oriented such that the diffractive exit surface is oriented at an angle between 40 degrees and 50 degrees relative to the central axis of the primary FOV.

21. The bioptic barcode reader of claim 12, wherein:

the optical element arrangement comprises a fifth mirror, a sixth mirror, and a seventh mirror;

the fifth mirror is positioned in a path of the primary FOV that passes through the transflective mirror or dichroic mirror and is configured to reflect the primary FOV that passes through the transflective mirror or dichroic mirror towards the sixth mirror;

the sixth mirror is configured to reflect the primary FOV reflected by the fifth mirror towards the seventh mirror; and the seventh mirror is configured to reflect the primary FOV reflected by the sixth mirror towards the second mirror.

22. The bioptic barcode reader of claim 21, wherein:

the fifth mirror is rotated about a Z axis that extends laterally between side walls of the lower housing portion such that the fifth mirror is oriented at a 45 degree angle relative to the upper surface and reflects the primary FOV that passes through the transflective mirror or dichroic mirror away from the upper surface of the lower housing portion;

the sixth mirror is rotated about a X axis that extends longitudinally between a front wall and a rear wall of the lower housing portion such that the sixth mirror is oriented at a 45 degree angle relative to the upper surface and reflects the primary FOV reflected by the fifth mirror between the side walls of the lower housing portion; and the seventh mirror is rotated about a Y axis that extends vertically between the upper surface and a bottom wall of the lower housing portion such that the seventh mirror is oriented at an angle between 40 degrees and 50 degrees relative to a rear wall of the lower housing portion and reflects the primary FOV reflected by the sixth mirror away from the rear wall of the lower housing portion.

* * * * *